United States Patent
Ji et al.

(10) Patent No.: US 12,335,919 B2
(45) Date of Patent: Jun. 17, 2025

(54) METHOD TO TRANSMIT FEEDBACK IN NON-TERRESTRIAL NETWORKS

(71) Applicant: QUALCOMM Incorporated, San Diego, CA (US)

(72) Inventors: Lianghai Ji, San Diego, CA (US); Liangping Ma, San Diego, CA (US); Huilin Xu, Temecula, CA (US); Qiang Wu, San Diego, CA (US); Weimin Duan, San Diego, CA (US); Mehmet Izzet Gurelli, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 17/574,385

(22) Filed: Jan. 12, 2022

(65) Prior Publication Data

US 2023/0224863 A1 Jul. 13, 2023

(51) Int. Cl.
*H04W 72/02* (2009.01)
*H04W 24/08* (2009.01)
*H04W 72/0446* (2023.01)
*H04W 72/1263* (2023.01)
*H04W 72/23* (2023.01)

(52) U.S. Cl.
CPC .......... *H04W 72/02* (2013.01); *H04W 24/08* (2013.01); *H04W 72/0446* (2013.01); *H04W 72/1263* (2013.01); *H04W 72/23* (2023.01)

(58) Field of Classification Search
CPC . H04W 24/08; H04W 72/02; H04W 72/0446; H04W 72/23; H04W 72/1263; H04W 72/232; H04L 5/0055
USPC ............................................ 370/280, 312, 329
See application file for complete search history.

(56) References Cited

U.S. PATENT DOCUMENTS

| | | | |
|---|---|---|---|
| 2022/0015082 A1* | 1/2022 | Farag | H04L 5/0055 |
| 2024/0048279 A1* | 2/2024 | Wang | H04W 72/232 |
| 2024/0057113 A1* | 2/2024 | Zhu | H04L 5/0055 |
| 2024/0064765 A1* | 2/2024 | Zhu | H04L 5/0055 |

FOREIGN PATENT DOCUMENTS

WO WO-2022241688 A1 * 11/2022 ............ H04W 72/23

* cited by examiner

*Primary Examiner* — Harun Chowdhury
(74) *Attorney, Agent, or Firm* — Holland & Hart LLP

(57) ABSTRACT

Methods, systems, and devices for wireless communications are described. A user equipment (UE) may receive, from a network node, downlink control information (DCI) that schedules a downlink transmission and one or more repetitions of the downlink transmission. The DCI may indicate a first uplink resource for a first feedback message indicating whether the UE receives the downlink transmission and the one or more repetitions. Based on receiving the DCI, the UE may select a second uplink resource for a second feedback message indicating feedback that the UE received the DCI, where the second uplink resource occurs prior to the first uplink resource in a time domain. The UE may transmit the second feedback message on the second uplink resource. The UE and the network node may be part of a non-terrestrial network and, in some examples, may apply a configuration indicated in the DCI based on the second feedback message.

21 Claims, 16 Drawing Sheets

METHOD TO TRANSMIT FEEDBACK IN NON-TERRESTRIAL NETWORKS

FIELD OF TECHNOLOGY

The following relates to wireless communications, including methods to transmit feedback in non-terrestrial networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE and a base station or other network node may be geographically separated by a relatively large distance (e.g., the UE and the base station may be a part of a non-terrestrial network (NTN)). In such cases, there may be a significant round-trip or propagation delay in message transmissions between the UE and the base station or the rother network node. Efficient techniques for managing communications with such relatively long round-trip or propagation delays may reduce overall system latency.

SUMMARY

The described techniques relate to improved methods, systems, devices, and apparatuses that support methods to transmit feedback in non-terrestrial networks (NTNs). Generally, the described techniques provide for a UE to receive downlink control information (DCI) scheduling a downlink transmission and one or more repetitions of the downlink transmission, and transmit a feedback message indicating that the UE received the DCI. The DCI may indicate a first uplink resource for a first feedback message that indicates a reception status of the downlink transmission and the one or more repetitions (e.g., whether the UE received the downlink transmission and the one or more repetitions). Based on receiving the DCI, the UE may select a second uplink resource for a second feedback message that indicates a reception status of the DCI and may transmit the second feedback message on the second uplink resource. In some cases, the UE may transmit the second feedback message on the second uplink resource before transmitting the first feedback message on the first uplink resource. In other cases, the UE may monitor for the downlink transmission and one or more of the repetitions before transmitting the second feedback message.

In some examples, the UE may select the second uplink resource based on a mapping between the second uplink resource and a downlink resource over which the DCI is received, a mapping between the second uplink resource and a quantity of the one or more repetitions, or a combination thereof. In other examples, the UE may select the second uplink resource based on a set of candidate uplink resources for the second feedback message. Additionally, or alternatively, the UE may select the second uplink resource based on an indication within the DCI. A method for wireless communications at a UE is described. The method may include receiving DCI scheduling a downlink transmission and one or more repetitions of the downlink transmission, the DCI indicating a first uplink resource for a first feedback message indicating whether the UE receives at least one of the downlink transmission and the one or more repetitions, selecting, based on receiving the DCI, a second uplink resource for a second feedback message indicating that the UE receives the DCI, where the second uplink resource occurs prior to the first uplink resource in a time domain, and transmitting the second feedback message on the second uplink resource, the second feedback message including feedback that the UE received the DCI.

An apparatus for wireless communications at a UE is described. The apparatus may include a processor, memory coupled with the processor, and instructions stored in the memory. The instructions may be executable by the processor to cause the apparatus to receive DCI scheduling a downlink transmission and one or more repetitions of the downlink transmission, the DCI indicating a first uplink resource for a first feedback message indicating whether the UE receives at least one of the downlink transmission and the one or more repetitions, select, based on receiving the DCI, a second uplink resource for a second feedback message indicating that the UE receives the DCI, where the second uplink resource occurs prior to the first uplink resource in a time domain, and transmit the second feedback message on the second uplink resource, the second feedback message including feedback that the UE received the DCI.

Another apparatus for wireless communications at a UE is described. The apparatus may include means for receiving DCI scheduling a downlink transmission and one or more repetitions of the downlink transmission, the DCI indicating a first uplink resource for a first feedback message indicating whether the UE receives at least one of the downlink transmission and the one or more repetitions, means for selecting, based on receiving the DCI, a second uplink resource for a second feedback message indicating that the UE receives the DCI, where the second uplink resource occurs prior to the first uplink resource in a time domain, and means for transmitting the second feedback message on the second uplink resource, the second feedback message including feedback that the UE received the DCI.

A non-transitory computer-readable medium storing code for wireless communications at a UE is described. The code may include instructions executable by a processor to receive DCI scheduling a downlink transmission and one or more repetitions of the downlink transmission, the DCI indicating a first uplink resource for a first feedback message indicating whether the UE receives at least one of the downlink transmission and the one or more repetitions, select, based on receiving the DCI, a second uplink resource for a second feedback message indicating that the UE receives the DCI, where the second uplink resource occurs prior to the first uplink resource in a time domain, and transmit the second feedback message on the second uplink resource, the second feedback message including feedback that the UE received the DCI.

Some examples of the method, apparatuses, and non-transitory computer-readable medium described herein may further include operations, features, means, or instructions for transmitting the first feedback message on the first uplink resource after transmitting the second feedback message on the second uplink resource, where the first feedback message indicates whether the UE receives at least one of the downlink transmission and the one or more repetitions.

Some examples of the method, apparatuses, and non-transitory computer-readable medium described herein may further include operations, features, means, or instructions for monitoring a downlink channel for the downlink transmission and the one or more repetitions based on receiving the DCI, where transmitting the first feedback message may be based on monitoring the downlink channel.

In some examples of the method, apparatuses, and non-transitory computer-readable medium described herein, the second feedback message may be transmitted prior to monitoring the downlink channel for the downlink transmission and the one or more repetitions.

In some examples of the method, apparatuses, and non-transitory computer-readable medium described herein, the second uplink resource occurs after the UE monitors for a subset of the downlink transmission and the one or more repetitions.

Some examples of the method, apparatuses, and non-transitory computer-readable medium described herein may further include operations, features, means, or instructions for transmitting, as part of the second feedback message, feedback for the subset of the downlink transmission and the one or more repetitions.

In some examples of the method, apparatuses, and non-transitory computer-readable medium described herein, the DCI indicates configuration information for communications with a network node and the method, apparatuses, and non-transitory computer-readable medium may include further operations, features, means, or instructions for applying a configuration associated with the configuration information based on transmitting the second feedback message on the second uplink resource.

Some examples of the method, apparatuses, and non-transitory computer-readable medium described herein may further include operations, features, means, or instructions for receiving at least one of the downlink transmission and the one or more repetitions prior to transmitting the second feedback message, where the second feedback message indicates that the UE receives at least one of the downlink transmission and the one or more repetitions.

Some examples of the method, apparatuses, and non-transitory computer-readable medium described herein may further include operations, features, means, or instructions for refraining from transmitting the first feedback message on the first uplink message based on receiving at least one of the downlink transmission and the one or more repetitions prior to transmitting the second feedback message and transmitting the second feedback message that indicates that the UE receives at least one of the downlink transmission and the one or more repetitions.

In some examples of the method, apparatuses, and non-transitory computer-readable medium described herein, selecting the second uplink resource may include operations, features, means, or instructions for selecting the second uplink resource based on a mapping between the second uplink resource and a downlink resource over which the DCI may be received, a mapping between the second uplink resource and a quantity of the one or more repetitions, or a combination thereof.

In some examples of the method, apparatuses, and non-transitory computer-readable medium described herein, selecting the second uplink resource may include operations, features, means, or instructions for selecting the second uplink resource from a set of candidate uplink resources for the second feedback message based on successfully receiving a corresponding downlink transmission or a repetition of the one or more repetitions.

In some examples of the method, apparatuses, and non-transitory computer-readable medium described herein, the DCI indicates the set of candidate uplink resources.

In some examples of the method, apparatuses, and non-transitory computer-readable medium described herein, the set of candidate uplink resources may be indicated by at least one of the DCI, a downlink resource over which the DCI may be received, and a quantity of the downlink transmission and the one or more repetitions.

In some examples of the method, apparatuses, and non-transitory computer-readable medium described herein, the second feedback message includes a negative acknowledgement indicating that the UE received the DCI and failed to receive the downlink transmission or a repetition of the one or more repetitions.

In some examples of the method, apparatuses, and non-transitory computer-readable medium described herein, the DCI indicates the second uplink resource.

In some examples of the method, apparatuses, and non-transitory computer-readable medium described herein, the second feedback message, the first feedback message, or both, include a HARQ feedback message indicating an acknowledgement or a negative acknowledgement.

In some examples of the method, apparatuses, and non-transitory computer-readable medium described herein, the UE includes a node in an NTN.

A method for wireless communications at a network node is described. The method may include transmitting, to a UE, DCI scheduling a downlink transmission and one or more repetitions of the downlink transmission, the DCI indicating a first uplink resource for a first feedback message indicating whether the UE receives the downlink transmission and the one or more repetitions, transmitting the downlink transmission and the one or more repetitions in accordance with the DCI, and receiving a second feedback message on a second uplink resource, the second feedback message including feedback that the UE received the DCI, where the second uplink resource occurs prior to the first uplink resource in a time domain.

An apparatus for wireless communications at a network node is described. The apparatus may include a processor, memory coupled with the processor, and instructions stored in the memory. The instructions may be executable by the processor to cause the apparatus to transmit, to a UE, DCI scheduling a downlink transmission and one or more repetitions of the downlink transmission, the DCI indicating a first uplink resource for a first feedback message indicating whether the UE receives the downlink transmission and the one or more repetitions, transmit the downlink transmission and the one or more repetitions in accordance with the DCI, and receive a second feedback message on a second uplink resource, the second feedback message including feedback that the UE received the DCI, where the second uplink resource occurs prior to the first uplink resource in a time domain.

Another apparatus for wireless communications at a network node is described. The apparatus may include means for transmitting, to a UE, DCI scheduling a downlink transmission and one or more repetitions of the downlink transmission, the DCI indicating a first uplink resource for a first feedback message indicating whether the UE receives the downlink transmission and the one or more repetitions, means for transmitting the downlink transmission and the one or more repetitions in accordance with the DCI, and means for receiving a second feedback message on a second uplink resource, the second feedback message including feedback that the UE received the DCI, where the second uplink resource occurs prior to the first uplink resource in a time domain.

A non-transitory computer-readable medium storing code for wireless communications at a network node is described. The code may include instructions executable by a processor to transmit, to a UE, DCI scheduling a downlink transmission and one or more repetitions of the downlink transmission, the DCI indicating a first uplink resource for a first feedback message indicating whether the UE receives the downlink transmission and the one or more repetitions, transmit the downlink transmission and the one or more repetitions in accordance with the DCI, and receive a second feedback message on a second uplink resource, the second feedback message including feedback that the UE received the DCI, where the second uplink resource occurs prior to the first uplink resource in a time domain.

Some examples of the method, apparatuses, and non-transitory computer-readable medium described herein may further include operations, features, means, or instructions for modifying one or more communications parameters for communications with the UE based on receiving the second feedback message.

In some examples of the method, apparatuses, and non-transitory computer-readable medium described herein, the one or more communications parameters correspond to a configuration indicated in the DCI.

In some examples of the method, apparatuses, and non-transitory computer-readable medium described herein, the one or more communications parameters include a quantity of repetitions for a subsequent downlink transmission.

In some examples of the method, apparatuses, and non-transitory computer-readable medium described herein, the DCI indicates configuration information for communications with the UE and the method, apparatuses, and non-transitory computer-readable medium may include further operations, features, means, or instructions for applying a configuration associated with the configuration information based on receiving the second feedback message on the second uplink resource.

Some examples of the method, apparatuses, and non-transitory computer-readable medium described herein may further include operations, features, means, or instructions for receiving the second feedback message on the second uplink resource before transmitting one or more of the repetitions, where the second feedback message indicates that the UE received at least one of the downlink transmission and the one or more repetitions and refraining from transmitting one or more of the repetitions based on receiving the second feedback message.

Some examples of the method, apparatuses, and non-transitory computer-readable medium described herein may further include operations, features, means, or instructions for receiving the first feedback message on the first uplink resource after receiving the second feedback message on the second uplink resource, where the first feedback message indicates whether the UE received at least one of the downlink transmission and the one or more repetitions.

In some examples of the method, apparatuses, and non-transitory computer-readable medium described herein, the second feedback message may be received after transmitting the downlink transmission and the one or more repetitions, the second feedback message indicating that the UE received at least one of the downlink transmission and the one or more of the repetitions.

Some examples of the method, apparatuses, and non-transitory computer-readable medium described herein may further include operations, features, means, or instructions for transmitting an indication of a set of candidate uplink resources including the second uplink resource for the second feedback message, where receiving the second feedback message may be based on the indication.

In some examples of the method, apparatuses, and non-transitory computer-readable medium described herein, the DCI indicates the set of candidate uplink resources.

In some examples of the method, apparatuses, and non-transitory computer-readable medium described herein, each candidate uplink resource of the set of candidate uplink resources corresponds to a subset of the downlink transmission and the one or more repetitions.

DETAILED DESCRIPTION

Figure 1:
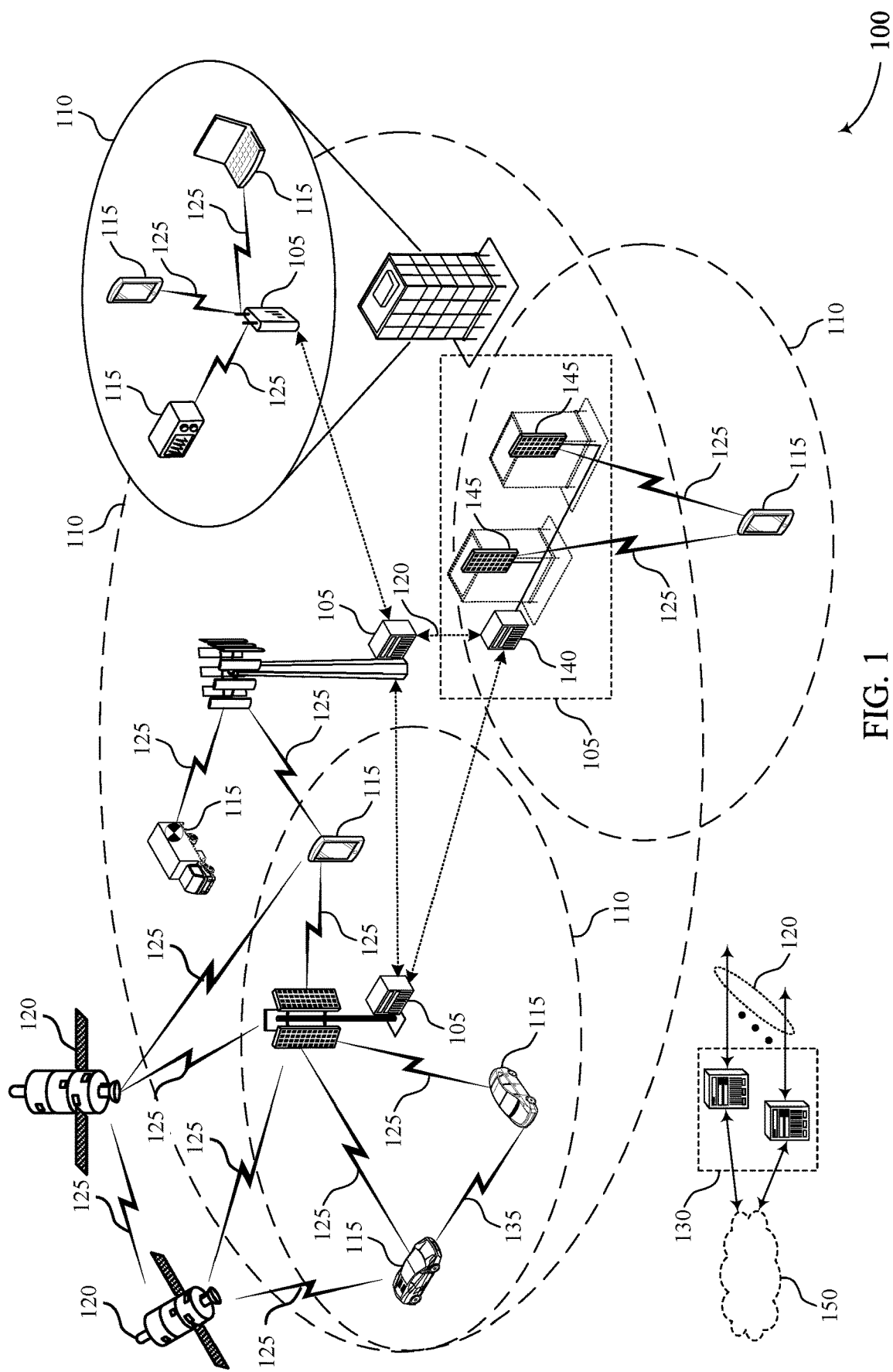
FIGS. 1 and 2 illustrate examples of wireless communications systems that support methods to transmit feedback in non-terrestrial networks (NTNs) in accordance with aspects of the present disclosure.

In some wireless communications systems, a network node (e.g., such as a base station) and a user equipment (UE) may be geographically separated by a relatively long distance. For example, non-terrestrial networks (NTNs) may provide wireless connectivity using high altitude devices, such as satellites, that may act as base stations or relays in a wireless communications system. NTNs may involve the use of high-altitude platform stations (HAPs) or satellites to provide coverage for terrestrial base stations and UEs. As described herein, a "terrestrial" base station may refer to a base station deployed on the ground, a base station that operates a terrestrial network, or a base station that operates an NTN via a satellite, or a combination thereof. In some cases, some satellites in an NTN may operate as base stations, and UEs may communicate directly with a serving satellite. Alternatively, some satellites in an NTN may act as a radio frequency (RF) repeater, which may forward a signal between a base station (e.g. an on-ground, terrestrial base station) and a UE. A base station may control or otherwise operate an NTN via a satellite. In other cases, base stations or other satellites may relay transmissions between a serving satellite and a UE. Satellites operate in a variety of earth orbits, and at a variety of distances away from the surface of the earth. For example, satellites may function in low-earth orbit (LEO), medium earth orbit (MEO), geostationary earth orbit (GEO), geosynchronous orbit (GSO), highly elliptical orbits (HEO), or another type of orbit. Each type of orbit may be defined for ranges of distances away from the surface of the earth.

In such systems, the distance between a UE and a serving satellite may be much greater than typical distances between a UE and a base station in a terrestrial network, and it may take some time for electromagnetic waves to propagate over the distance between the satellite and the UE. Thus, a propagation delay for NTNs may be orders of magnitude larger than a propagation delay for terrestrial networks. As such, a round trip delay (RTD) associated with a signal may also be orders of magnitude larger for NTNs than for terrestrial networks. The RTD associated with NTNs may introduce significant latency and reduce efficiency in the system, which may be especially be problematic for hybrid automatic repeat request (HARQ) processes. A base station (e.g., a satellite) in an NTN may transmit a message to a UE and may wait to receive HARQ feedback from the UE to determine if the UE successfully received the message. If the HARQ feedback is used by the base station for subsequent communications with the UE, for example, to determine if a new transmission or a re-transmission should be scheduled for the corresponding HARQ process, the large RTD may stall the HARQ process and introduce significant latency.

In some cases, to avoid stalling, the base station and the UE may communicate without waiting for HARQ feedback. For instance, the base station may disable HARQ feedback for some transmissions, or the UE may aggregate HARQ feedback for multiple downlink transmissions into a single feedback message. As an illustrative example, the base station may transmit control signaling, such as downlink control information (DCI), that blindly schedules a downlink transmission and one or more repetitions of the downlink transmission, and the UE may transmit a single feedback message that includes feedback for the downlink transmission and the repetitions. Here, the base station may decrease latency by proactively transmitting multiple repetitions of the downlink transmission (e.g., without waiting for feedback for individual downlink transmissions). However, in cases where the DCI also indicates configuration information (e.g., for subsequent communications), the base station may not know if the UE has applied the indicated configuration until the UE acknowledges receipt of the DCI (e.g., via the HARQ feedback message that may occur after the downlink transmission and one or more retransmissions). That is, the base station may refrain from communicating according to the indicated configuration for a time duration of at least the propagation delay of the DCI, a time duration for transmitting the DCI, the downlink transmission and one or more repetitions of the downlink transmission scheduled by the DCI, and a propagation delay of the feedback message, among other examples. The RTD may therefore cause significant delay in application of the indicated configuration. For example, the time duration for transmitting the DCI, the downlink transmission, and the one or more repetitions of the downlink transmission can be quite large, e.g., due to a large quantity of repetitions, resource congestion, or a combination thereof.

The techniques described herein support transmission of feedback for DCI, which may reduce latency and improve communications efficiency. For example, a UE may receive, from a base station, a DCI that schedules a downlink transmission and one or more repetitions of the downlink transmission, and indicates a first uplink resource for a first feedback message associated with the downlink transmission and the one or more repetitions. The UE may select a second uplink resource for transmission of a second feedback message that indicates successful reception of the DCI. The UE may transmit the second feedback message over the second uplink resource before transmitting the first feedback message over the first uplink resource. In some examples, the DCI may indicate a set of candidate uplink resources, and the UE may select a second uplink resource from the indicated options. Additionally, or alternatively, the second uplink resource may occur after a subset of the scheduled downlink transmission and/or one or more of the repetitions, and the second feedback message may indicate reception statuses of the DCI and the subset of the downlink transmission, one or more of the repetitions, or a combination thereof.

In some examples, the base station and/or the UE may modify one or more communications parameters based on the second feedback message. For example, the DCI may indicate configuration information for subsequent communications between the base station and the UE. The UE may apply a configuration as indicated by the configuration information based on transmitting the second feedback message, e.g. based on the timing of the transmitted second feedback message. Likewise, the base station may apply the indicated configuration information based on receiving the second feedback message. If the base station does not receive a feedback message indicating that the UE received the DCI, the base station may determine that the DCI was not successfully received by the UE, and may refrain from applying the configuration.

Particular implementations of the subject matter described in this disclosure can be implemented to realize one or more of the following potential advantages. For example, the described techniques may support reduced latency in applying control modifications by providing feedback regarding DCI reception status without waiting to receive scheduled downlink data transmissions. Thus, techniques discussed herein may enhance the reliability and efficiency of the wireless communications system. As such, supported techniques may include improved NTN communication performance and, in some examples, may promote network efficiencies, among other benefits.

Aspects of the disclosure are initially described in the context of wireless communications systems. Aspects of the disclosure are further illustrated by and described with reference to a feedback procedure and a process flow. Aspects of the disclosure are further illustrated by and described with reference to apparatus diagrams, system diagrams, and flowcharts that relate to method to transmit feedback in NTNs.

FIG. 1 illustrates an example of a wireless communications system 100 that supports methods to transmit feedback in NTNs in accordance with aspects of the present disclosure. The wireless communications system 100 may include one or more base stations 105, one or more UEs 115, one or more satellites 120, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 120, which may be examples of high altitude devices. A satellite 120 may communicate with base stations 105 and UEs 115 (or other high altitude or terrestrial communications devices). The satellite 120 may be any suitable type of communication satellite configured to relay communications between different end nodes in a wireless communication system. The satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit, or a medium earth orbit. In some examples, the satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of an NTN. A satellite 120 may, in some cases, perform at least a portion of the functions of a base station 105, act as a regenerative satellite, or may act as a bent-pipe satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite (also referred to as a transparent satellite) may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa. In some cases, a base station 105 may control an NTN via a satellite 120.

UEs 115 may communicate with satellites 120 and/or base stations 105 using communications links 125. For example, a UE 115 may communicate with a satellite 120 via a communication link 125. The altitude of the satellite 120 may increase propagation delays and RTDs associated with communications between the UE 115 and the satellite 120, as well as with communications between the UE 115 and a base station 105, e.g. if the satellite 120 acts as a base station 105 or if the satellite 120 relays communications between the UE 115 and a base station 105. In some cases, a UE 115 may generate feedback (e.g., HARQ ACK/NACK feedback) for one or more communications received from the satellite 120, and the UE 115 may transmit feedback messages to the satellite 120.

The techniques described herein support transmission of feedback for DCI when propagation delays and RTDs are relatively large, which may reduce latency and improve communications efficiency. For example, the UE 115 may receive, from the satellite 120, a DCI that schedules a downlink transmission and one or more repetitions of the downlink transmission, and indicates a first uplink resource for a first feedback message associated with the downlink transmission and the one or more repetitions. The UE 115 may select a second uplink resource for transmission of a second feedback message that indicates successful reception of the DCI. The UE 115 may transmit, to the satellite 120, the second feedback message on the second uplink resource before transmitting the first feedback message on the first uplink resource.

In some examples, the UE 115 may select the second resource based on the DCI. For instance, the DCI may indicate the second uplink resource, or the UE 115 may determine the second uplink resource based on information associated with the DCI (e.g., a downlink resource on which the UE 115 receives the DCI, a quantity of downlink repetitions scheduled by the DCI, etc.) In some cases, the UE 115 may select a second uplink resource from a set of candidate uplink resources. In some examples, the second uplink resource may occur after the scheduled downlink transmission and/or one or more of the repetitions, and the second feedback message may indicate feedback for the DCI and the downlink transmission, one or more of the repetitions, or a combination thereof.

In some examples, the satellite 120 and/or the UE 115 may modify one or more communications parameters based on the second feedback message. For example, the DCI may indicate configuration information for subsequent communications between the satellite 120 and the UE 115. The UE 115 may apply a configuration as indicated by the configuration information based on transmitting the second feedback message, e.g. based on the timing of the transmitted second feedback message. Likewise, the satellite 120 may apply the indicated configuration information based on receiving the second feedback message, e.g. based on the timing of the received second feedback message. As an example, for communications between the UE 115 and the satellite 120, the UE 115 may apply the indicated configuration information after transmitting the second feedback message, and/or the satellite 120 may apply the indicated configuration information after receiving the second feedback message. In one example, the UE 115 and the satellite 120 may apply the indicated configuration information after a configured (e.g., pre-configured) time duration after transmitting and receiving the second feedback message, respectively. If the satellite 120 does not receive a feedback message indicating that the UE received the DCI, the satellite 120 may determine that the DCI was not successfully received by the UE, and may refrain from applying the configuration.

Figure 2:
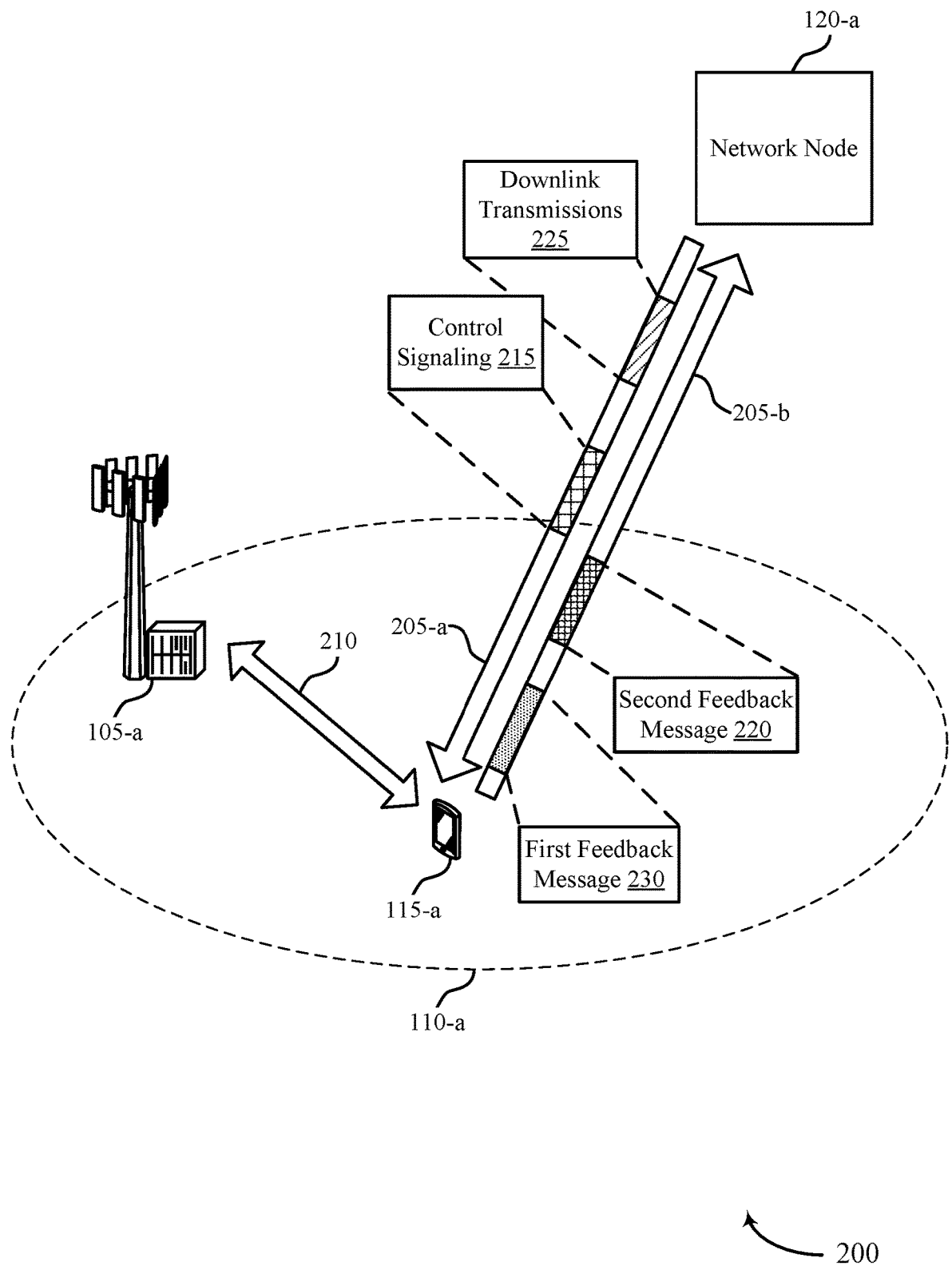

FIG. 2 illustrates an example of a wireless communications system 200 that supports methods to transmit feedback in NTNs in accordance with aspects of the present disclosure. In some examples, wireless communications system 200 may implement aspects of wireless communications system 100. Wireless communications system 200 may include a base station 105-a and a UE 115-a, which may be examples of a base station 105 and a UE 115 as described with reference to FIG. 1. Additionally, wireless communications system 200 may include a network node 120-a. The UE 115-a may communicate with the network node 120-a via communication links 205 (e.g., transmission channels), and the UE 115-a may optionally communicate with the base station 105-a via a communication link 210.

In some examples, a base station, such as the base station 105-a, may be a terrestrial base station. A terrestrial base station may be a base station that is deployed on-ground. In some cases, a terrestrial base station may be deployed on the ground and may operate an NTN, e.g., via an NTN node, such as a satellite (e.g., a transparent satellite) or other high-altitude device. For instance, the base station 105-a may be deployed on-ground and may serve a coverage area 110-a. The base station 105-a may operate an NTN and may communicate with the UE 115-a via a satellite (e.g., a transparent satellite), such as the network node 120-a. Here, the network node 120-a may act as a relay between the base station 105-a and the UE 115-a. Additionally, or alternatively, a terrestrial base station may refer to a base station that operates a terrestrial network. As an example, the base station 105-a may serve a coverage area 110-a as part of a terrestrial network, and the network node 120-a may serve the coverage area 110-a as part of an NTN.

The network node 120-a may be an example of an NTN node. As described herein, a network node may refer to a base station (e.g., a base station 105), a satellite (e.g., a satellite 120 as described with reference to FIG. 1), or a combination thereof. For example, in a first deployment, the network node 120-a may be an example of a satellite that implements or otherwise performs functions of a base station. Here, the network node 120-a may communicate with one or more terrestrial base stations, such as a terrestrial base station 105 or a terrestrial base station not shown in FIG. 1 (e.g., via backhaul communication links) and/or UEs 115. In some cases, the network node 120-a may operate as a serving base station for the UE 115-a. In a second deployment, functions of a base station may be implemented by a base station deployed on the ground (e.g., the base station 105-a or a base station now shown in FIG. 1), and a satellite may act as a repeater between the base station (e.g. the base station 105 or a base station not shown in FIG. 1) and the UEs 115. In this deployment, the network node 120-a may refer to (e.g., be an example of) functions performed by the base station, the satellite, or both.

The network node 120-a may orbit the earth's surface at a particular altitude. The distance between the network node 120-a and the UE 115-a may be much greater than the distance between the base station 105-a and the UE 115-a. The distance between the UE 115-a and the network node 120-a may cause an increased propagation delay and RTD in communications between the UE 115-a and the network node 120-a. For example, a round trip time (RTT) may refer to the amount of time it takes for a signal to be transmitted from the network node 120-a to the UE 115-a and for a response to the signal (e.g., feedback) to be transmitted from the UE 115-a to the network node 120-a. Networks (e.g., NTNs) with relatively large propagation delays may have relatively long RTT durations. In the example of FIG. 2, messages communicated via the communication links 205 between the UE 115-a and the network node 120-a may have a much larger RTT than messages communicated via the communication link 210 between the base station 105-a and the UE 115-a.

Long RTT durations may be problematic in some feedback processes (e.g., HARQ feedback processes). For example, the network node 120-a may transmit a first downlink transmission to the UE 115-a, and may rely on corresponding feedback (e.g., HARQ feedback) received from the UE 115-a to determine whether a subsequent transmission is to be a new transmission or a retransmission of the first downlink transmission. Additionally, until the satellite receives the HARQ feedback, the network node 120-a may be unable to perform another transmission or reception with the same HARQ process ID. The large propagation delay resulting from the large distance between the UE 115-a and the network node 120-a may introduce a HARQ RTT that is much larger than a HARQ RTT in a terrestrial network. Even if the UE 115-a transmits a feedback message indicating the HARQ feedback immediately after receiving the first downlink transmission, the network node 120-a will not receive the feedback message for at least one RTT, and may be forced to wait for the duration of the RTT before proceeding with subsequent transmissions, modifying communications parameters, or performing other procedures. This stop-and-wait scenario may be referred to as "HARQ stalling."

To avoid HARQ stalling, an NTN may disable HARQ feedback. For example, the network node 120-a may transmit DCI and one or more downlink messages (e.g., scheduled by the DCI) to the UE 115-a without waiting for feedback (e.g., HARQ feedback). To improve reliability, the network node 120-a may transmit each downlink transmission with one or more repetitions; the UE 115-a may fail to receive the initial downlink transmission, but may successfully receive one or more of the repetitions. However, transmitting an increased quantity of repetitions also increases resource consumption and reduces efficiency in communications between the UE 115-*a* and the network node 120-*a*. As an alternative, the UE 115-*a* may aggregate feedback for the multiple downlink transmissions and corresponding repetitions into a single feedback message, such that the network node 120-*a* may avoid waiting to receive feedback for each individual transmission. In this example, however, the time duration between when the network node 120-*a* starts transmitting the DCI (e.g., to schedule the downlink transmission and the one or more repetitions) and when the network node 120-*a* receives the feedback includes the aggregated time intervals for the downlink transmission and the one or more repetitions, and the network node 120-*a* may wait for the length of this extended time duration if any procedures rely on receiving the feedback.

For example, the network node 120-*a* may transmit control signaling 215 (e.g., DCI) that blindly schedules a set of downlink transmissions 225, which may include an initial downlink transmission (e.g., a physical downlink shared channel (PDSCH) transmission) and one or more repetitions of the downlink transmission. The network node 120-*a* may transmit the downlink transmissions 225 without waiting to receive feedback from the UE 115-*a*. Further, the control signaling 215 may indicate a first uplink resource (e.g., a physical uplink control channel (PUCCH) resource, a physical uplink shared channel (PUSCH) resource) that the UE 115-*a* may use for transmission of a first feedback message 230 associated with the downlink transmissions 225. The first feedback message 230 may be an example of a feedback message that includes HARQ feedback. The first uplink resource may be scheduled to occur after the last scheduled repetition of the downlink transmissions 225, e.g., in the time domain, and the first feedback message 230 may include feedback that indicates whether the UE 115-*a* receives at least one of the downlink transmissions 225 (e.g., at least one of the initial downlink transmission and/or the one or more repetitions). In some cases, the first feedback message 230 may be an example of a HARQ feedback message, where feedback including an acknowledgement (ACK) indicates that the UE 115-*a* successfully received the control signaling 215 and at least one of the downlink transmissions 225 and feedback including a negative acknowledgement (NACK) indicates that the UE 115-*a* successfully received the control signaling 215 but failed to successfully receive any of the downlink transmissions 225.

Upon receiving the control signaling 215, the UE 115-*a* may attempt to receive the downlink transmissions 225 on the scheduled resources. If the UE 115-*a* successfully receives and decodes at least one of the initial downlink transmission and/or one or more of the repetitions, the UE 115-*a* may transmit the first feedback message 230 indicating an ACK over the indicated first uplink resource. Alternatively, if the UE 115-*a* fails to receive any of the downlink transmissions 225, the UE 115-*a* may indicate, in the first feedback message 230, a NACK. Based on the feedback in the first feedback message 230, the network node 120-*a* may determine whether a subsequent transmission to the UE 115-*a* is to be a new transmission or a retransmission. For instance, the network node 120-*a* may retransmit one or more instances (e.g., repetitions) of the downlink transmissions 225 (e.g., if the feedback is a NACK) or may schedule a new transmission to the UE 115-*a* (e.g., if the feedback is an ACK). In some examples, the feedback transmitted by the UE 115-*a* in the first feedback message 230 may enable the network node 120-*a* to adapt future transmissions. For example, the network node 120-*a* may increase a quantity of blind repetitions if the network node 120-*a* receives a NACK, which may improve the likelihood that the UE 115-*a* is able to successfully receive at least one of the repetitions.

In some examples, the feedback transmitted by the UE 115-*a* in the first feedback message 230 over the indicated first uplink resource may additionally indicate (e.g., implicitly or explicitly) that the UE 115-*a* successfully received the control signaling 215. The control signaling 215 may include or otherwise indicate control and/or configuration information to be implemented for follow-up communications between the network node 120-*a* and the UE 115-*a*, such as a semi-persistent scheduling (SPS) activation or release indicator, a bandwidth part indicator, a secondary cell dormancy indicator, or a minimum applicable scheduling offset indicator, or a combination thereof, among other examples. The configuration information may indicate new parameters or may modify an existing configuration.

Upon successfully receiving the control signaling 215, the UE 115-*a* may stop using previously configured parameters and may apply or otherwise update the configuration information indicated in the control signaling 215 for follow-up communications with the network node 120-*a*. However, the network node 120-*a* may wait to apply the indicated configuration information until receiving an indication (e.g., via the first feedback message 230) that the UE 115-*a* successfully received the control signaling 215. For example, the control signaling 215 may indicate a bandwidth part such that the UE 115-*a* may switch to the indicated bandwidth part to monitor for subsequent communications from the network node 120-*a*. But if the UE 115-*a* fails to successfully receive the control signaling 215, the UE 115-*a* may be unaware that subsequent communications from the network node 120-*a* will occur in the indicated bandwidth part. Accordingly, the network node 120-*a* may refrain from communicating according to the indicated configuration until receiving the first feedback message 230 indicating that the UE 115-*a* successfully received the control signaling 215.

Each transmission, including the control signaling 215, the downlink transmissions 225, and the first feedback message 230, is associated with a propagation delay corresponding to the distance between the UE 115-*a* and the network node 120-*a*, and the RTT includes the sum of a time duration for transmitting the control signaling 215 and the downlink transmissions 225, a time duration equal to twice the single-trip propagation delay between the network node 120-*a* and the UE 115-*a*, and any processing delays at either device. Put another way, the RTT begins when the network node 120-*a* transmits the control signaling 215, and ends when the satellite receives the first feedback message 230. Accordingly, as the quantity of downlink repetitions increases (e.g., to improve reliability), the RTT may increase by an amount corresponding to the sum of time durations for transmitting the control signaling 215 and the downlink transmissions 225. Additionally, due to the relatively large coverage areas associated with to NTNs, communication resources may be limited, and the network node 120-*a* may not be able to schedule consecutive time domain resources for the repetitions included in the downlink transmissions 225. Thus, the network node 120-*a* may have to schedule the one or more the repetitions on resources that are dispersed (i.e., nonsequential) in the time domain, further increasing the RTT. If the feedback indicated by the first feedback message 230 transmitted over the first uplink resource is used by the network node 120-*a* to determine when (or if) to apply the indicated configuration for follow-up communications with the UE 115-*a*, the network node 120-*a* may be forced to stop and wait for the duration of the RTT before applying the configuration, which may introduce significant latency into the wireless communications system 200 especially as the RTT increases.

To reduce latency for applying the indicated configuration, and to improve efficiency in communications and resource utilization, the UE 115-*a* may transmit a second feedback message 220 to acknowledge successful reception of the control signaling 215 before transmitting the first feedback message 230 (e.g., indicating feedback for the downlink transmissions 225). In some cases, the UE 115-*a* may transmit the second feedback message 220 without waiting to receive any of the downlink transmissions 225, such that the RTT associated with the control signaling 215 may include propagation delays of the control signaling 215 and the second feedback message 220, but not the sum of time durations for transmitting the downlink transmissions 225. The network node 120-*a* may therefore apply the configuration indicated in the control signaling 215 with correspondingly decreased latency, and communications performance in the wireless communications system 200 may be enhanced.

For example, the network node 120-*a* may transmit control signaling 215 (e.g., DCI) to the UE 115-*a* that schedules downlink transmission(s) 225. The downlink transmissions 225 may include an initial downlink transmission (e.g., a PDSCH transmission) and one or more repetitions (e.g., one or more blind PDSCH repetitions) of the downlink transmission. The control signaling 215 may also indicate the first uplink resource for the first feedback message 230, which may indicate a reception status of the downlink transmission(s) 225. The UE 115-*a* may monitor a downlink channel (e.g., of the communication link 205-*a*) for the downlink transmission and the one or more repetitions in accordance with the control signaling 215.

Based on receiving the control signaling 215, the UE 115-*a* may select a second uplink resource (e.g., a PUSCH resource, a PUCCH resource) for the second feedback message 220, where the second feedback message 220 indicates that the UE 115-*a* successfully received the control signaling 215. In some cases, the second feedback message 220 may be an example of a HARQ feedback message and may indicate an ACK associated with the control signaling 215. The second uplink resource on which the UE 115-*a* transmits the second feedback message 220 may be between a downlink resource on which the UE 115-*a* receives the control signaling 215 and the first uplink resource of the first feedback message 230, e.g., in the time domain. Put another way, the second uplink resource may occur prior to the first uplink resource in the time domain, such that the UE 115-*a* may transmit the second feedback message 220 after receiving the control signaling 215 but before transmitting the first feedback message 230.

In examples where the control signaling 215 indicates configuration information for communications with the network node 120-*a*, the UE 115-*a* may apply a configuration associated with the configuration information based on transmitting the second feedback message 220 on the second uplink resource. The network node 120-*a* may likewise apply a configuration associated with the configuration information based on receiving the second feedback message 220 on the second uplink resource.

In some examples, the control signaling 215 may include an indication (e.g., an explicit indication) of the second uplink resource and the UE 115-*a* may select the second uplink resource based on the indication. Additionally, or alternatively, the UE 115-*a* may identify or otherwise determine the second uplink resource, for example, based on other indications in the control signaling 215. In some cases, the UE 115-*a* may be configured with a mapping rule, which may map information associated with the control signaling 215 (e.g., the downlink resource over which the control signaling 215 is received, a quantity of the downlink transmission and the one or more repetitions scheduled by the control signaling 215, or the like) to the second uplink resource. Here, the UE 115-*a* may select the second uplink resource based on the mapping rule. In some examples, the UE 115-*a* may select the second uplink resource based on a combination of a mapping rule and an indication in the control signaling 215. In such examples, the control signaling 215 may indicate one or more parameters and the UE 115-*a* may select the second uplink resource based on a mapping between the one or more parameters and the second uplink resource. In some examples, the control signaling 215 may indicate one or more parameters and the UE 115-*a* may determine another one or more parameters based on a mapping rule; the UE 115-*a* may select or otherwise determine the second uplink resource based on the parameters.

In some cases, the UE 115-*a* may select the second uplink resource from a set of candidate uplink resources. For example, the control signaling 215 may indicate a set of candidate uplink resources, where a candidate uplink resource of the indicated set of candidate uplink resources may occur after the control signaling 215 and/or one or more of the downlink transmission(s) 225 in the time domain, and the UE 115-*a* may select the second uplink resource from the indicated set to transmit the second feedback message 220. Additionally, or alternatively, the UE 115-*a* may select the second uplink resource from the set of candidate uplink resources based on other indications in the control signaling 215, a mapping rule, a downlink resource over which the control signaling 215 is received, a quantity of the downlink transmission and the one or more repetitions, or a combination thereof.

The second uplink resource for the second feedback message 220 may occur at various instances within the time domain in relation to the control signaling 215, the downlink transmission(s) 225, and the first feedback message 230. For example, the UE 115-*a* may transmit the second feedback message 220 immediately after receiving the control signaling 215. Transmitting the second feedback message 220 immediately after receiving the control signaling 215 may enable indicated configuration information to be applied at the UE 115-*a* and the network node 120-*a* with minimal latency.

Alternatively, the second uplink resource may take place after the UE 115-*a* receives at least one of the downlink transmission and/or the one or more repetitions. For example, the second uplink resource may occur after the UE 115-*a* monitors the downlink channel for a subset of the downlink transmissions 225, and the UE 115-*a* may include feedback for the subset of downlink transmissions 225 as part of the second feedback message 220. In some cases, if the second feedback message 220 includes feedback for downlink transmissions 225, the UE 115-*a* may refrain from transmitting the first feedback message 230 on the first uplink resource.

In some examples, the UE 115-*a* may select the second uplink resource from a set of candidate uplink resources based on one or more of the downlink transmissions 225. For example, each candidate uplink resource may correspond to a respective downlink transmission 225 (e.g., the initial downlink transmission, a repetition of the one or more repetitions). The UE 115-*a* may monitor the downlink channel for the downlink transmissions 225 and may select a candidate uplink resource for the second feedback message 220 that occurs after (e.g., in the time domain) the first downlink transmission that the UE 115-*a* successfully receives. The network node 120-*a* may monitor each candidate uplink resource until the network node 120-*a* detects the second feedback message 220.

In such examples, the second feedback message 220 may additionally indicate feedback for the received downlink transmissions, a minimum quantity of downlink transmissions 225 that enables successful reception at the UE 115-*a*, or a combination thereof. For instance, if the UE 115-*a* transmits the second feedback message 220 on a candidate uplink resource that corresponds to a third repetition of the downlink transmission, the network node 120-*a* may determine that three repetitions provide the UE 115-*a* with sufficient information to receive the downlink transmission. In some cases, if the network node 120-*a* receives the second feedback message 220 before transmitting one or more of the downlink transmissions 225 scheduled by the control signaling 215 (e.g., before transmitting one or more of the repetitions), the network node 120-*a* may skip transmission of any remaining downlink transmissions.

The network node 120-*a* may adapt or otherwise modify communications parameters for subsequent transmissions to the UE 115-*a* based on the second feedback message 220. In the case that the second feedback message 220 indicates (e.g., via a NACK) that the UE 115-*a* successfully received the control signaling 215 successfully but failed to receive the any of the downlink transmissions 225, the network node 120-*a* may increase a quantity of repetitions of a subsequent downlink transmission, such that the UE 115-*a* may have an increased likelihood of successful reception. Conversely, if the second feedback message 220 indicates that the UE 115-*a* successfully received one or more of the downlink transmissions, the network node 120-*a* may transmit subsequent downlink transmissions with fewer repetitions. Additionally, or alternatively, the network node 120-*a* may indicate (e.g., in subsequent control signaling) a second uplink resource that occurs after a smaller subset of scheduled repetitions, such that the UE 115-*a* transmits the second feedback message 220 after monitoring for fewer downlink transmissions.

Based on monitoring the downlink channel for the downlink transmissions 225, the UE 115-*a* may transmit the first feedback message 230 over the first uplink resource, the first feedback message 230 indicating whether the UE 115-*a* successfully received at least one of the downlink transmission and the one or more repetitions. The first feedback message 230 may be a HARQ feedback message and may indicate an ACK if the UE 115-*a* successfully received at least one of the downlink transmission and the one or more repetitions, or may indicate a NACK if the UE 115-*a* failed to receive any of the downlink transmission and the one or more repetitions.

Figure 3:
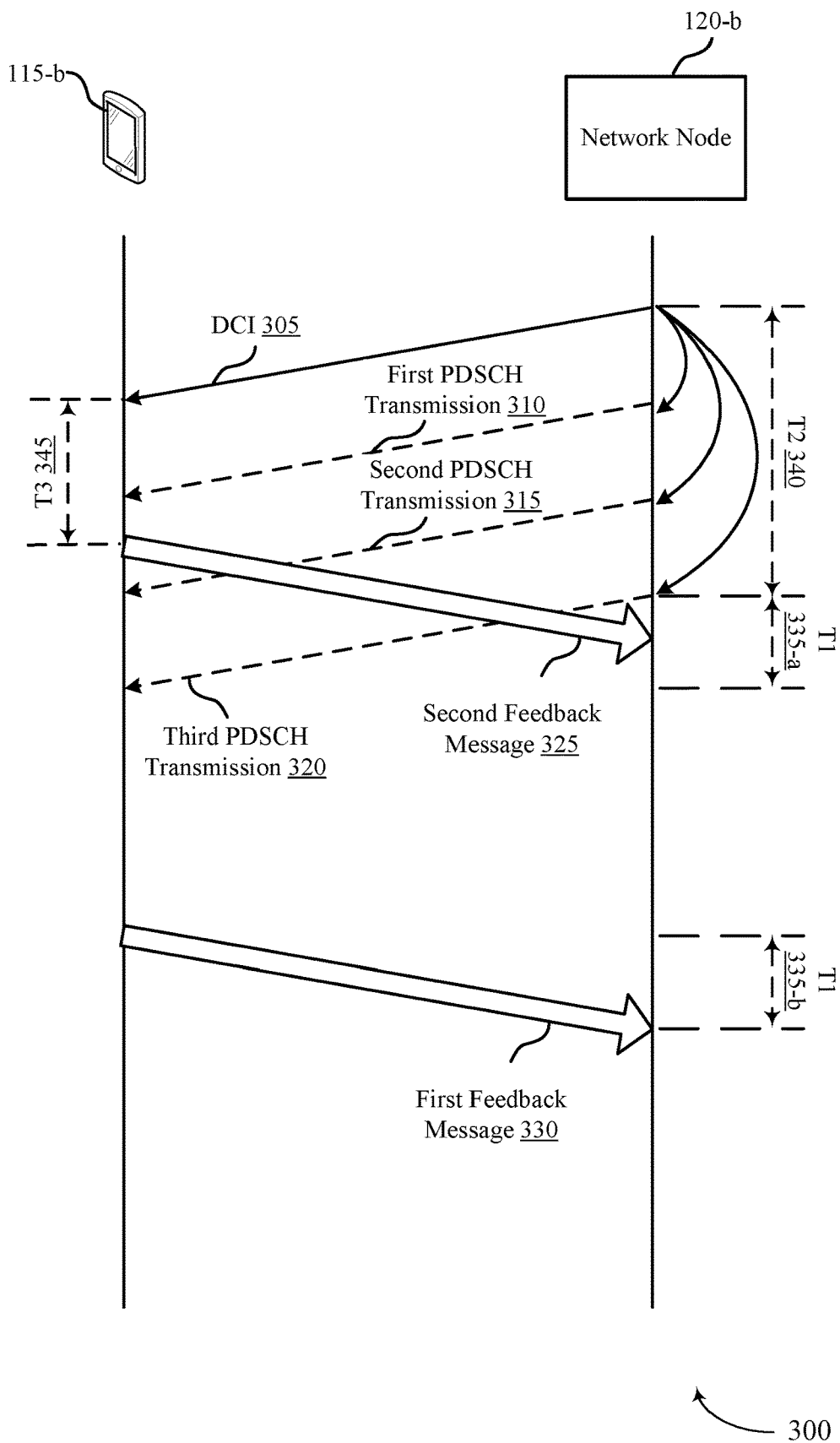
FIG. 3 illustrates an example of a feedback procedure that supports methods to transmit feedback in NTNs in accordance with aspects of the present disclosure.

FIG. 3 illustrates an example of a feedback procedure 300 that supports methods to transmit feedback in NTNs in accordance with aspects of the present disclosure. The feedback procedure 300 may implement or be implemented to realize aspects of the wireless communications systems 100 or 200. For example, the feedback procedure 300 illustrates communication between a UE 115-*b* and a network node 120-*b*, which may be examples of corresponding devices described herein with reference to FIGS. 1 and 2.

The feedback procedure 300 illustrates communications between a UE 115-*b* and a network node 120-*b*, which may be examples of nodes in an NTN. For example, the network node 120-*b* may be refer to or be an example of a satellite acting as (e.g., performing functions of) a base station, a satellite acting as a repeater or relay between the UE 115-*b* and a base station (or other network node), a base station communicating with the UE 115-*b* via a satellite, or a combination of a satellite and a base station. The network node 120-*b* may transmit, to the UE 115-*a*, a DCI 305 that schedules (e.g., blindly schedules) a quantity M of PDSCH repetitions. For instance, the DCI 305 transmitted by the network node 120-*b* may blindly schedule a first PDSCH transmission 310, a second PDSCH transmission 315, and a third PDSCH transmission 320 (e.g., M=3). The first PDSCH transmission 310 may be referred to as an initial downlink transmission and the second PDSCH transmission 315 and the third PDSCH transmission 320 may be referred to as repetitions of the downlink transmission.

The UE 115-*a* may monitor a downlink channel for the first PDSCH transmission 310, the second PDSCH transmission 315, and the third PDSCH transmission 320 based on receiving the DCI 305. Based on the monitoring, the UE 115-*b* may transmit feedback messages (e.g., HARQ feedback messages) over a first uplink resource and a second uplink resource. For instance, the UE 115-*b* may transmit a first feedback message 330 over a first uplink resource and a second feedback message 325 over a second uplink resource. The second feedback message 325 may indicate that the UE 115-*a* successfully received at least the DCI 305, and the first feedback message 330 may indicate whether the UE 115-*a* successfully received at least one of the PDSCH repetitions (e.g., at least one of the first PDSCH transmission 310, the second PDSCH transmission 315, and the third PDSCH transmission 320).

As described with reference to FIG. 2, the UE 115-*b* may select the second uplink resource based on information (e.g., an indication) included in the DCI 305, a downlink resource over which the UE 115-*b* receives the DCI 305, a quantity of the PDSCH repetitions, a mapping rule, or a combination thereof. The second uplink resource may occur prior to the first uplink resource in the time domain, such that the UE 115-*a* transmits the second feedback message 325 before transmitting the first feedback message 330. That is, the second uplink resource may occur between the downlink resource on which the UE 115-*b* receives the DCI 305 and the first uplink resource on which the UE 115-*b* transmits the first feedback message 330.

Each signal transmitted between the UE 115-*b* and the network node 120-*b* in NTN communications may be associated with a propagation delay that corresponds to the distance between the UE 115-*b* and the network node 120-*b*, and a processing delay associated with processing of a signal received at either the UE 115-*b* or the network node 120-*b*. The time durations associated with the propagation delays in the feedback procedure 300 may be defined. T1 335 may illustrate a one-way propagation delay for signaling between the UE 115-*b* and the network node 120-*b*. For example, T1 335-*a* may represent the propagation delay of the third PDSCH transmission 320 transmitted from the network node 120-*b* to the UE 115-*b*, and T1 335-*b* may represent the propagation delay of the first feedback message 330 transmitted from the UE 115-*b* to the network node 120-*b*. T2 340 may represent the time duration between transmission of the DCI 305 and transmission of the third PDSCH transmission 320 (e.g., the last PDSCH repetition scheduled by the DCI 305), which may include a sum of respective time durations for transmitting the DCI 305, the first PDSCH transmission 310, the second PDSCH transmission 315, and the third PDSCH transmission 320. In some examples, T2 340 may depend on the number of blind repetitions of the initial downlink transmission scheduled by the DCI 305, as well as resource availability in the NTN. For example, if the NTN is congested, few resources may be available at a given time, and the network node 120-b may not be able to transmit downlink transmissions in consecutive slots. In such examples, T2 340 may additionally include any time durations caused by the network node 120-b waiting for available resources.

T3 345 may represent the time duration between the UE 115-b receiving the DCI 305 (e.g., the downlink resource on which the UE 115-b receives the DCI 305) and the second uplink resource. Thus, T3 345 may vary based on the second uplink resource selected by the UE 115-b. T3 345 may have a minimum time duration when the UE 115-b selects the second uplink resource such that the UE 115-b transmits the second feedback message 325 immediately after receiving the DCI 305, e.g., before monitoring the downlink channel for scheduled downlink transmissions. In this example, T3 345 may be determined based on any processing delay at the UE 115-b, the second uplink resource selected by the UE 115-b, or a combination thereof.

In some examples, the second uplink resource may occur after the UE 115-b monitors for a subset of the PDSCH repetitions, and T3 345 may increase by the time duration for transmitting each PDSCH repetition in the subset. For example, the second uplink resource may be scheduled by the DCI 305 to occur after the second PDSCH transmission 315; T3 345 may thus include the time duration between the DCI 305 and the second uplink resource, which may occur after the second PDSCH transmission 315. In some cases, the UE 115-b may be configured (e.g., via control signaling) with a set of candidate uplink resources from which to select the second uplink resource. Each candidate uplink resource may correspond to a respective PDSCH repetition; in some examples, a candidate uplink resource may occur after the corresponding PDSCH repetition in the time domain. When the UE 115-b successfully receives a PDSCH repetition, the UE 115-b may select the corresponding candidate uplink resource as the second uplink resource to use for the second feedback message, and T3 345 may vary based on the quantity of PDSCH repetitions occurring before successful reception. For instance, if the UE 115-b successfully receives the first PDSCH transmission 310, the UE 115-b may select a second uplink resource that occurs after the first PDSCH transmission 310 in the time domain, e.g., based on a processing delay of the UE 115-b. T3 345 may include at least the processing delay of the UE 115-b associated with the DCI 305 and the first PDSCH transmission 310. If the second uplink resource occurs before the UE 115-b receives the last scheduled PDSCH transmission (e.g., the third PDSCH transmission 320), T3 345 may have a shorter time duration than T2 340. Accordingly, a total time delay in the feedback procedure 300 may be reduced.

Reducing total delay in the feedback procedure 300 may improve efficiency and reduce latency in communications between the UE 115-b and the network node 120-b. For example, the DCI 305 may indicate configuration information for subsequent communications with the network node 120-b, and the network node 120-b may delay application of a configuration associated with the configuration information until the UE 115-b confirms receipt of the DCI 305. If the UE 115-b transmits feedback for the DCI 305 as part of the first feedback message 330 (e.g., after receiving the PDSCH repetitions), the network node 120-b may be forced to wait for a time duration that includes propagation delays of the DCI 305, each PDSCH repetition, and the first feedback message 330. However, if the UE 115-b transmits feedback for the DCI 305 in the second feedback message 325, the delay may be significantly reduced.

For example, if the UE 115-b transmits feedback for the DCI 305 in the first feedback message 330 and does not transmit the second feedback message 325, the time delay for the network node 120-b to apply the configuration indicated in the DCI 305 may include a time duration T5, where T5=2T1+T2+T4. Here, T2 is the time duration defined by T2 340, T1 is the time duration defined by T1 335, and T4 is the collective time duration of additional processing delays which may occur at the UE 115-b and/or the network node 120-b. In contrast, when the UE 115-b transmits the second feedback message 325 before the first feedback message 330, the time delay for the network node 120-b to apply the configuration indicated in the DCI 305 may include a time duration T6, where T6=2×T1+T3+T4. T3 is the time duration defined by T3 345, which is less than T2; thus, T6 is a shorter time duration than T5. In other words, the time delay for the network node 120-b to apply the configuration based on the second feedback message 325 may be less than the time delay for the network node 120-b to apply the new configuration based on the first feedback message 330.

Figure 4:
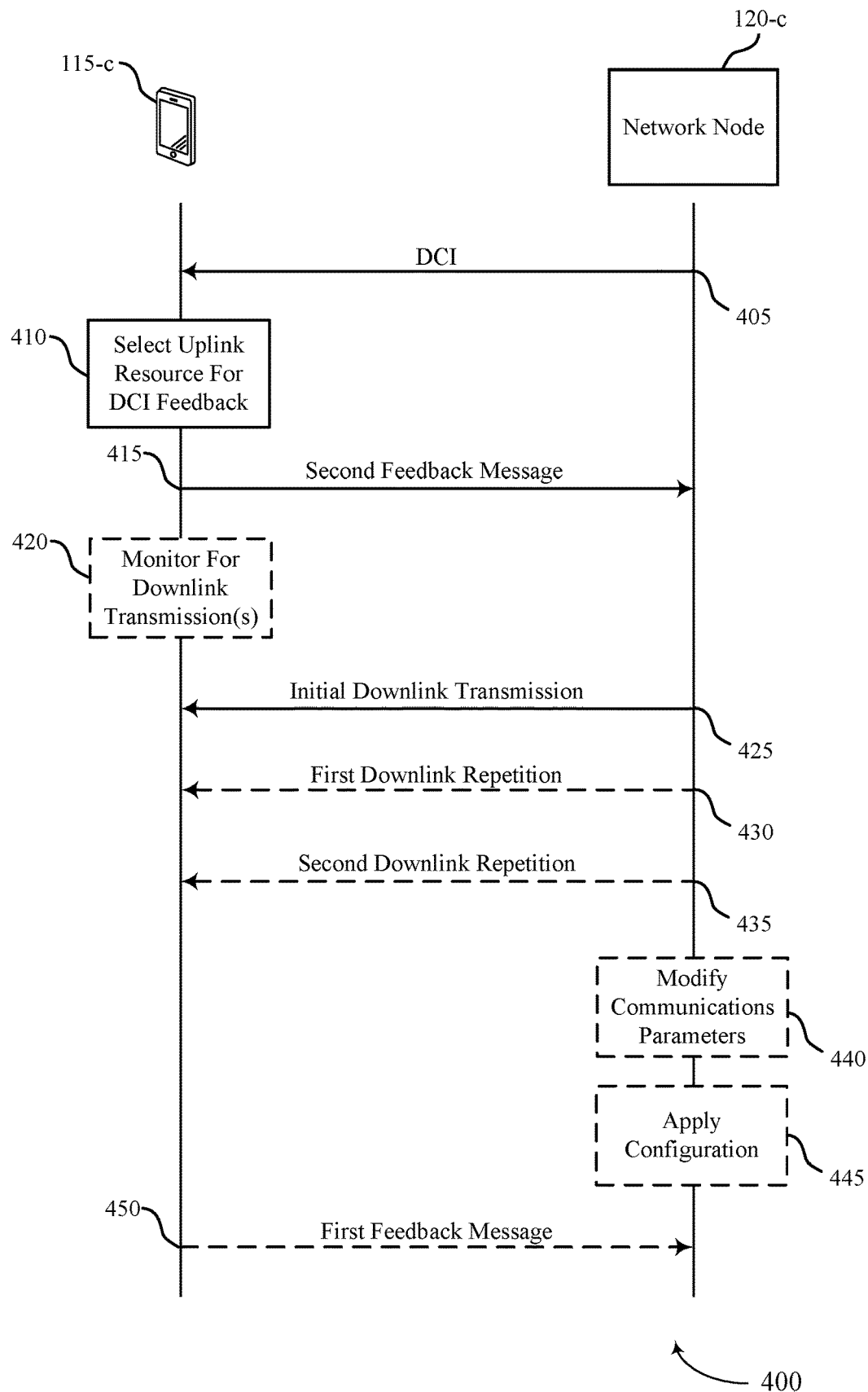
FIG. 4 illustrates an example of a process flow that supports methods to transmit feedback in NTNs in accordance with aspects of the present disclosure.

FIG. 4 illustrates an example of a process flow 400 that supports methods to transmit feedback in NTNs in accordance with aspects of the present disclosure. The process flow 400 may implement or be implemented to realize aspects of the wireless communications systems 100 or 200. For example, the process flow 400 illustrates communication between a UE 115-c and a network node 120-c, which may be examples of corresponding devices described herein, including with reference to FIGS. 1 and 2. The network node 120-c may be an example of a node in an NTN. For instance, the network node 120-c may refer to a satellite performing functions of a base station. In some cases, the network node 120-c may instead be a base station in a terrestrial network that is located a relatively large distance from the UE 115-c, a base station communicating with the UE 115-c via a satellite, a satellite acting as a repeater or relay for the base station and the UE 115-c, or a combination thereof. For example, the operations described herein may be performed by a combination of the network node 120-c and a base station. Alternative examples of the following may be implemented, where some steps are performed in a different order than described or are not performed at all. In some cases, steps may include additional features not mentioned below, or further steps may be added.

At 405, the network node 120-c may transmit, and the UE 115-c may receive, a DCI scheduling a downlink transmission and one or more repetitions of the downlink transmission (e.g., blindly scheduled PDSCH retransmissions). The DCI may indicate a first uplink resource for a first feedback message indicating whether the UE 115-c receives at least one of the downlink transmission and the one or more repetitions scheduled by the DCI. In some examples, the DCI may additionally indicate a second uplink resource for a second feedback message indicating that the UE 115-c received the DCI. In some cases, the DCI may indicate a set of one or more candidate uplink resources for the second feedback message, configuration information for communications with the network node 120-c, or a combination thereof.

At 410, the UE 115-c may select the second uplink resource for the second feedback message. The second uplink resource may occur before the first uplink resource in a time domain. In some examples, the UE 115-c may select the second uplink resource based on the DCI indicating the second uplink resource. In some examples, the UE 115-c may select the second uplink resource based on a mapping between the second uplink resource and a downlink resource over which the DCI is received, a mapping between the second uplink resource and a quantity of the one or more repetitions of the downlink transmission, or a combination thereof.

In some cases, the UE 115-c may select the second uplink resource from the set of candidate uplink resources, e.g., as indicated by the DCI. Each candidate uplink resource of the set of candidate uplink resources may correspond to a downlink transmission or retransmission. In some examples, the UE 115-c may select the second uplink resource from the set of candidate uplink resources based on a mapping between the second uplink resource and a downlink resource over which the DCI is received, a mapping between the second uplink resource and a quantity of the one or more repetitions of the downlink transmission, or a combination thereof.

At 415, the UE 115-c may transmit, and the satellite 115-c may receive, the second feedback message on the second uplink resource. The second feedback message may include feedback indicating that the UE 115-c successfully received the DCI. In some examples, the second feedback message may be an example of a HARQ feedback message indicating an ACK or a NACK. In some examples, the UE 115-c may transmit the second feedback message prior to monitoring a downlink channel (e.g., PDSCH) for the downlink transmission and the one or more repetitions scheduled by the DCI. In some cases, if the DCI indicates configuration information for communications with the network node 120-c, the UE 115-c may apply a configuration associated with the configuration information based on transmitting the second feedback message on the second uplink resource.

At 420, the UE 115-c may monitor the downlink channel for the downlink transmission and the one or more repetitions based on receiving the DCI.

At 425, the satellite 115-c may transmit, and the UE 115-c may receive, the downlink transmission, e.g., based on the monitoring.

At 430, the network node 120-c may transmit, and the UE 115-c may receive, the first downlink repetition.

At 435, the network node 120-c may transmit, and the UE 115-c may receive, the second downlink repetition.

In some examples, the UE 115-c may instead transmit the second feedback message after monitoring for a subset of the downlink transmission and the one or more repetitions, or based on receiving at least one of the downlink transmission and the one or more repetitions. That is, the UE 115-c may transmit the second feedback message after monitoring for and/or receiving the downlink transmission at 425, the first downlink repetition at 430, the second downlink repetition at 435, or a combination thereof. In some cases, the UE 115-c may select the second uplink resource for the second feedback message from a set of candidate uplink resources based on successfully receiving a corresponding downlink transmission or a corresponding repetition of the one or more repetitions.

In some examples, the second feedback message may include feedback for a subset of the downlink transmission and the one or more repetitions. For example, the second feedback message may indicate that the UE 115-c received the initial downlink transmission, the one or more retransmissions, or a combination thereof. In some cases, the second feedback message may include a NACK indicating that the UE 115-c successfully received the DCI but failed to receive the downlink transmission or a repetition of the one or more repetitions.

In some cases, the network node 120-c may receive the second feedback message before transmitting one or more of the repetitions scheduled by the DCI. In such cases, the network node 120-c may refrain from transmitting additional repetitions based on receiving the second feedback message.

At 440, the network node 120-c may modify one or more communications parameters for communications with the UE 115-c based on receiving the second feedback message. In some examples, the one or more communications parameters include of a quantity of repetitions for a subsequent downlink transmission.

At 445, the network node 120-c may apply a configuration for subsequent communications between the UE 115-c and the network node 120-c based on receiving the second feedback message. The configuration may be associated with configuration information indicated in the DCI, e.g., as transmitted at 405.

At 450, the UE 115-c may transmit, and the network node 120-c may receive, the first feedback message. In some examples, the UE 115-c may transmit the first feedback message based on monitoring the downlink channel. The UE 115-c may transmit the first feedback message on the first uplink resource after transmitting the second feedback message on the second uplink resource. The first feedback message may indicate whether the UE 115-c received the downlink transmission, the one or more repetitions, or a combination thereof.

In some examples, the UE 115-c may refrain from transmitting the first feedback message on the first uplink resource based on receiving the initial downlink transmission or the one or more retransmissions prior to transmitting the second feedback message. In such cases, the second feedback message may indicate that the UE 115-c received the initial downlink transmission, the one or more retransmissions, or a combination thereof.

Figure 5:
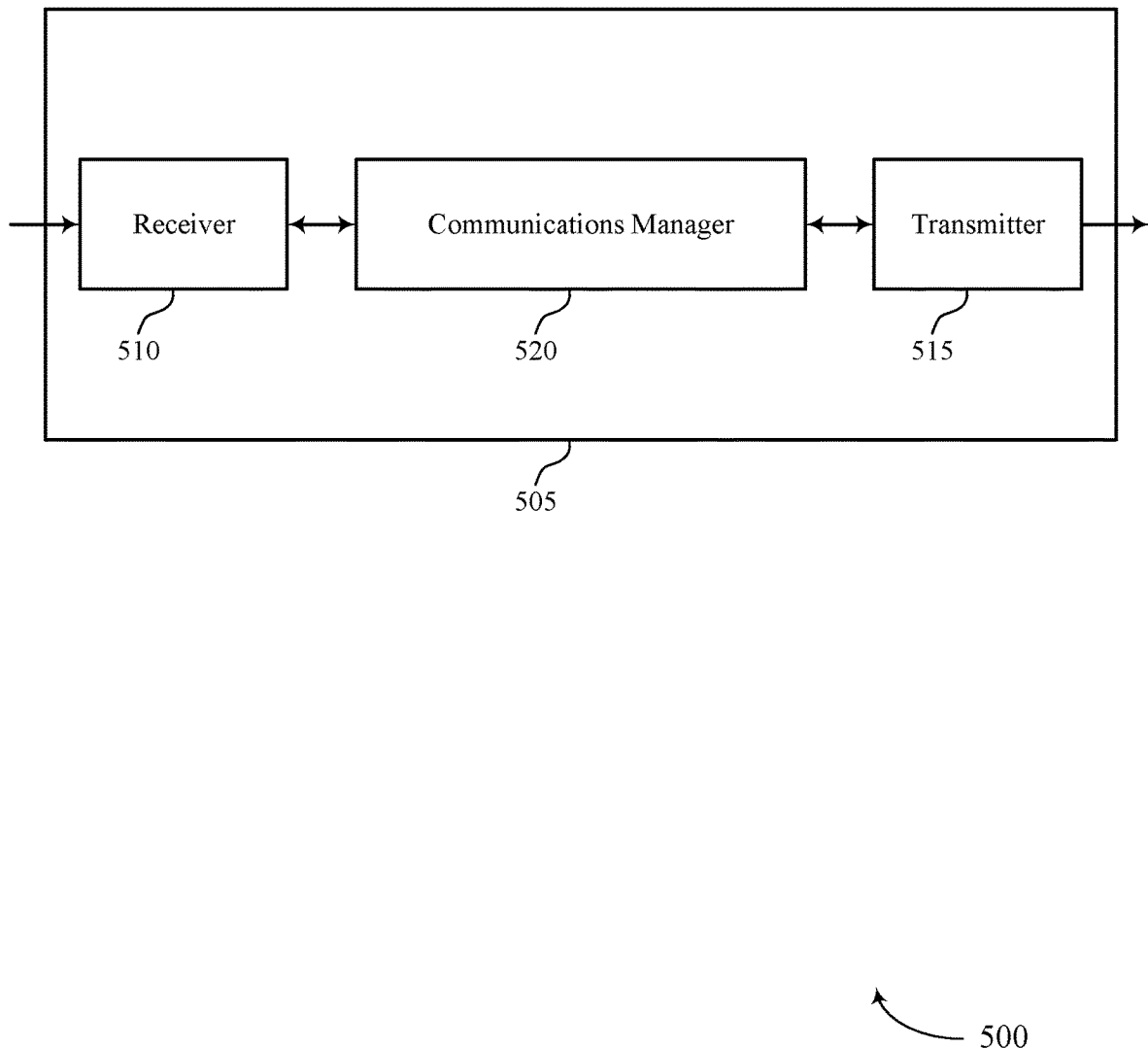
FIGS. 5 and 6 show block diagrams of devices that support methods to transmit feedback in NTNs in accordance with aspects of the present disclosure.

FIG. 5 shows a block diagram 500 of a device 505 that supports methods to transmit feedback in NTNs in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to method to transmit feedback in NTNs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to method to transmit feedback in NTNs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of method to transmit feedback in NTNs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving DCI scheduling a downlink transmission and one or more repetitions of the downlink transmission, the DCI indicating a first uplink resource for a first feedback message indicating whether the UE receives at least one of the downlink transmission and the one or more repetitions. The communications manager 520 may be configured as or otherwise support a means for selecting, based on receiving the DCI, a second uplink resource for a second feedback message indicating that the UE received the DCI, where the second uplink resource occurs prior to the first uplink resource in a time domain. The communications manager 520 may be configured as or otherwise support a means for transmitting the second feedback message on the second uplink resource, the second feedback message including feedback that the UE received the DCI.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for avoiding stalling in feedback processes due to large propagation delays and RTTs between the device 505 and a transmitting device such as a base station or satellite. Transmitting feedback for control signaling without waiting to receive a set of scheduled downlink transmissions may enable enhanced efficiency and reduced latency. Additionally, the device 505 may avoid receiving an increased quantity of retransmissions, which may improve reliability and throughput while reducing power consumption, among other advantages.

Figure 6:
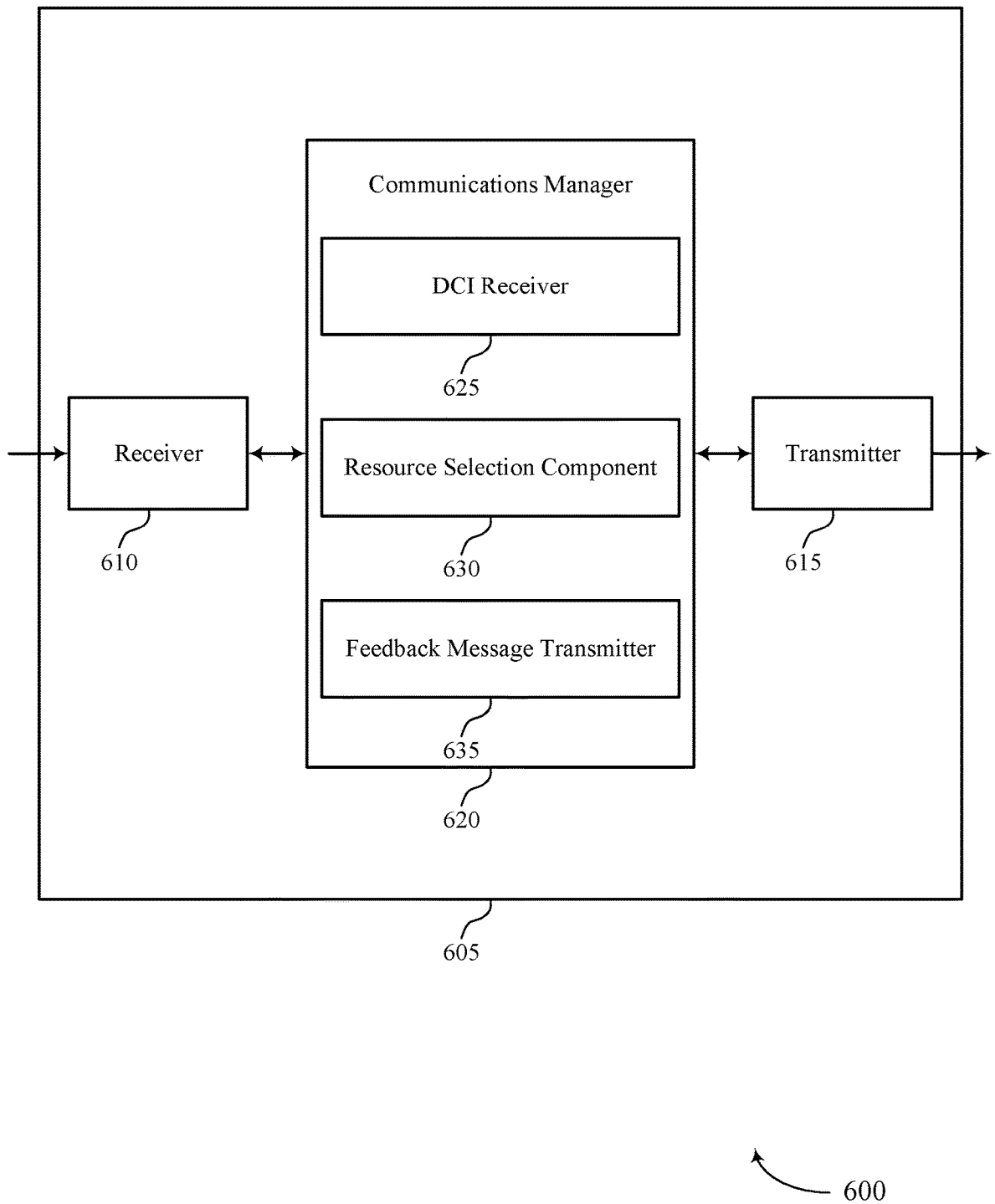

FIG. 6 shows a block diagram 600 of a device 605 that supports methods to transmit feedback in NTNs in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to method to transmit feedback in NTNs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to method to transmit feedback in NTNs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of method to transmit feedback in NTNs as described herein. For example, the communications manager 620 may include a DCI receiver 625, a resource selection component 630, a feedback message transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The DCI receiver 625 may be configured as or otherwise support a means for receiving DCI scheduling a downlink transmission and one or more repetitions of the downlink transmission, the DCI indicating a first uplink resource for a first feedback message indicating whether the UE receives at least one of the downlink transmission and the one or more repetitions. The resource selection component 630 may be configured as or otherwise support a means for selecting, based on receiving the DCI, a second uplink resource for a second feedback message indicating that the UE received the DCI, where the second uplink resource occurs prior to the first uplink resource in a time domain. The feedback message transmitter 635 may be configured as or otherwise support a means for transmitting the second feedback message on the second uplink resource, the second feedback message including feedback that the UE received the DCI.

Figure 7:
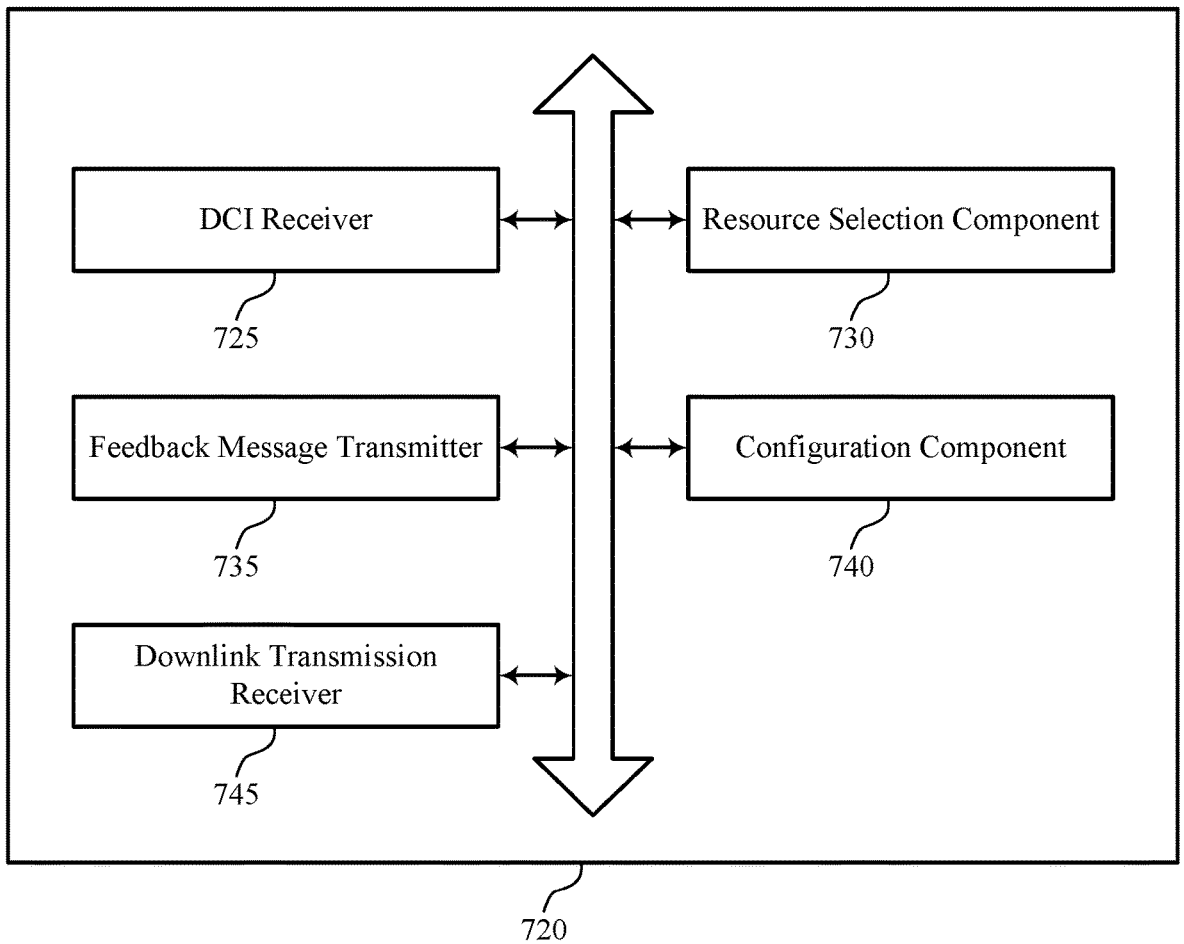
FIG. 7 shows a block diagram of a communications manager that supports methods to transmit feedback in NTNs in accordance with aspects of the present disclosure.

FIG. 7 shows a block diagram 700 of a communications manager 720 that supports methods to transmit feedback in NTNs in accordance with aspects of the present disclosure. The communications manager 720 may be an example of aspects of a communications manager 520, a communications manager 620, or both, as described herein. The communications manager 720, or various components thereof, may be an example of means for performing various aspects of method to transmit feedback in NTNs as described herein. For example, the communications manager 720 may include a DCI receiver 725, a resource selection component 730, a feedback message transmitter 735, a configuration component 740, a downlink transmission receiver 745, or any combination thereof. Each of these components may communicate, directly or indirectly, with one another (e.g., via one or more buses).

The communications manager 720 may support wireless communications at a UE in accordance with examples as disclosed herein. The DCI receiver 725 may be configured as or otherwise support a means for receiving DCI scheduling a downlink transmission and one or more repetitions of the downlink transmission, the DCI indicating a first uplink resource for a first feedback message indicating whether the UE receives at least one of the downlink transmission and the one or more repetitions. The resource selection component 730 may be configured as or otherwise support a means for selecting, based on receiving the DCI, a second uplink resource for a second feedback message indicating that the UE received the DCI, where the second uplink resource occurs prior to the first uplink resource in a time domain. The feedback message transmitter 735 may be configured as or otherwise support a means for transmitting the second feedback message on the second uplink resource, the second feedback message including feedback that the UE received the DCI.

In some examples, the feedback message transmitter 735 may be configured as or otherwise support a means for transmitting the first feedback message on the first uplink resource after transmitting the second feedback message on the second uplink resource, where the first feedback message indicates whether the UE receives at least one of the downlink transmission and the one or more repetitions.

In some examples, the feedback message transmitter 735 may be configured as or otherwise support a means for monitoring a downlink channel for the downlink transmission and the one or more repetitions based on receiving the DCI, where transmitting the first feedback message is based on monitoring the downlink channel. In some examples, the second feedback message is transmitted prior to monitoring the downlink channel for the downlink transmission and the one or more repetitions.

In some examples, the second uplink resource occurs after the UE monitors for a subset of the downlink transmission and the one or more repetitions.

In some examples, the feedback message transmitter 735 may be configured as or otherwise support a means for transmitting, as part of the second feedback message, feedback for the subset of the downlink transmission and the one or more repetitions.

In some examples, the DCI indicates configuration information for communications with a network node, and the configuration component 740 may be configured as or otherwise support a means for applying a configuration associated with the configuration information based on transmitting the second feedback message on the second uplink resource.

In some examples, the downlink transmission receiver 745 may be configured as or otherwise support a means for receiving at least one of the downlink transmission and the one or more repetitions prior to transmitting the second feedback message, where the second feedback message indicates that the UE receives at least one of the downlink transmission and the one or more repetitions.

In some examples, the downlink transmission receiver 745 may be configured as or otherwise support a means for refraining from transmitting the first feedback message on the first uplink message based on receiving at least one of the downlink transmission and the one or more repetitions prior to transmitting the second feedback message and transmitting the second feedback message that indicates that the UE receives at least one of the downlink transmission and the one or more repetitions.

In some examples, to support selecting the second uplink resource, the resource selection component 730 may be configured as or otherwise support a means for selecting the second uplink resource based on a mapping between the second uplink resource and a downlink resource over which the DCI is received, a mapping between the second uplink resource and a quantity of the one or more repetitions, or a combination thereof.

In some examples, to support selecting the second uplink resource, the resource selection component 730 may be configured as or otherwise support a means for selecting the second uplink resource from a set of candidate uplink resources for the second feedback message based on successfully receiving a corresponding downlink transmission or a repetition of the one or more repetitions. In some examples, the DCI indicates the set of candidate uplink resources. In some examples, the set of candidate uplink resources is indicated by at least one of the DCI, a downlink resource over which the DCI is received, and a quantity of the downlink transmission and the one or more repetitions.

In some examples, the second feedback message includes a negative acknowledgement indicating that the UE received the DCI and failed to receive the downlink transmission or a repetition of the one or more repetitions.

In some examples, the DCI indicates the second uplink resource. In some examples, the second feedback message, the first feedback message, or both, include a HARQ feedback message indicating an ACK or a NACK. In some examples, the UE includes a node in an NTN.

Figure 8:
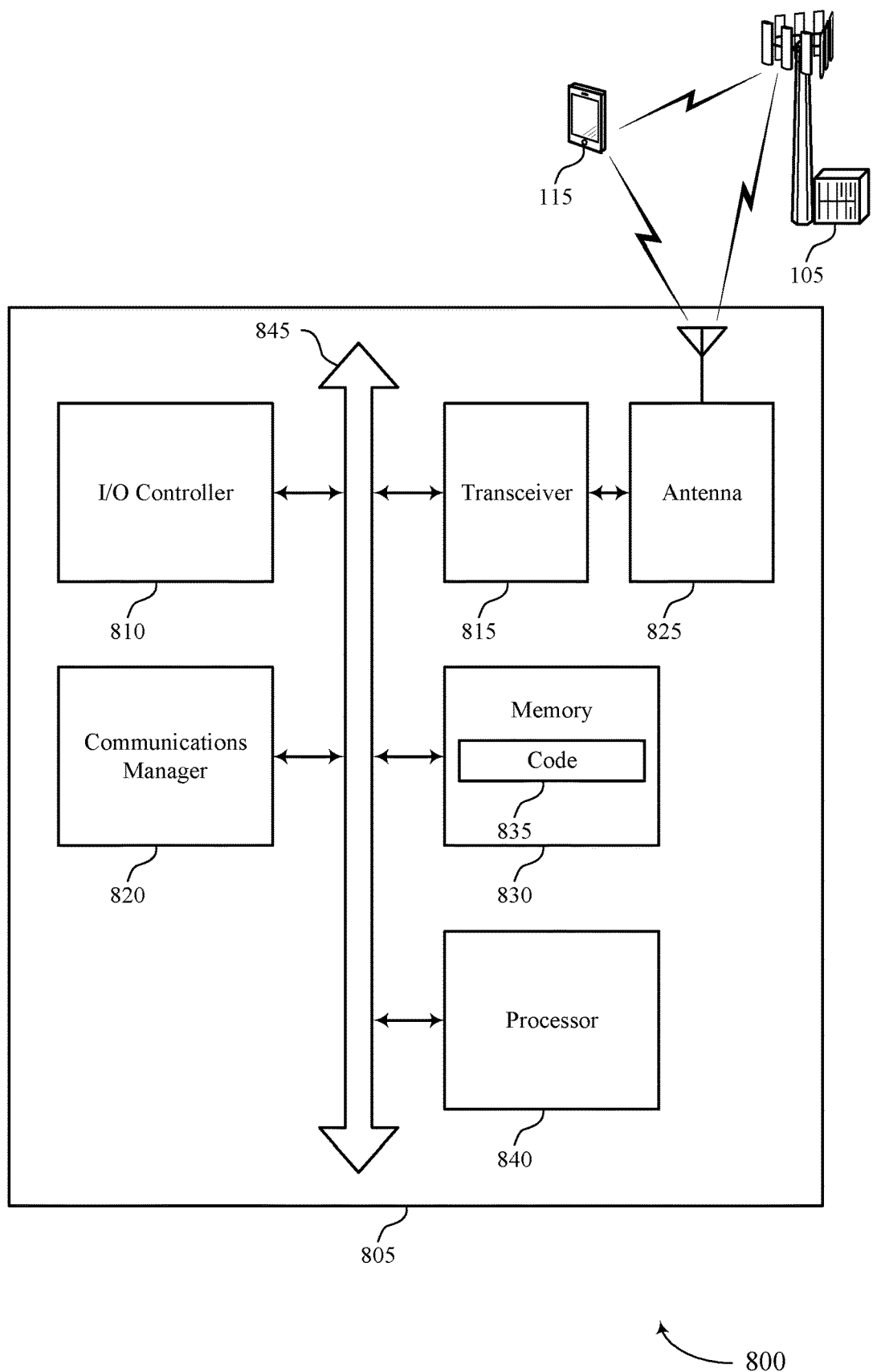
FIG. 8 shows a diagram of a system including a device that supports methods to transmit feedback in NTNs in accordance with aspects of the present disclosure.

FIG. 8 shows a diagram of a system 800 including a device 805 that supports methods to transmit feedback in NTNs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting method to transmit feedback in NTNs). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving DCI scheduling a downlink transmission and one or more repetitions of the downlink transmission, the DCI indicating a first uplink resource for a first feedback message indicating whether the UE receives at least one of the downlink transmission and the one or more repetitions. The communications manager 820 may be configured as or otherwise support a means for selecting, based on receiving the DCI, a second uplink resource for a second feedback message indicating that the UE received the DCI. The communications manager 820 may be configured as or otherwise support a means for transmitting the second feedback message on the second uplink resource, the second feedback message including feedback that the UE received the DCI, where the second uplink resource occurs prior to the first uplink resource in a time domain.

By including or configuring the communications manager 820 in accordance with examples as described herein, the device 805 may support techniques for avoiding stalling in feedback processes due to large propagation delays and RTTs between the device 805 and a transmitting device such as a base station or satellite. The techniques described herein may allow for enhanced reliability and reduced latency compared to cases where feedback processes may be disabled. Transmitting feedback with reduced latency may reduce a quantity of repetitions used for successful repetition at the device 805, which may improve efficient utilization of communication resources and increase system throughput, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of method to transmit feedback in NTNs as described herein, or the processor 840 and the memory 830 may be otherwise configured to perform or support such operations.

Figure 9:
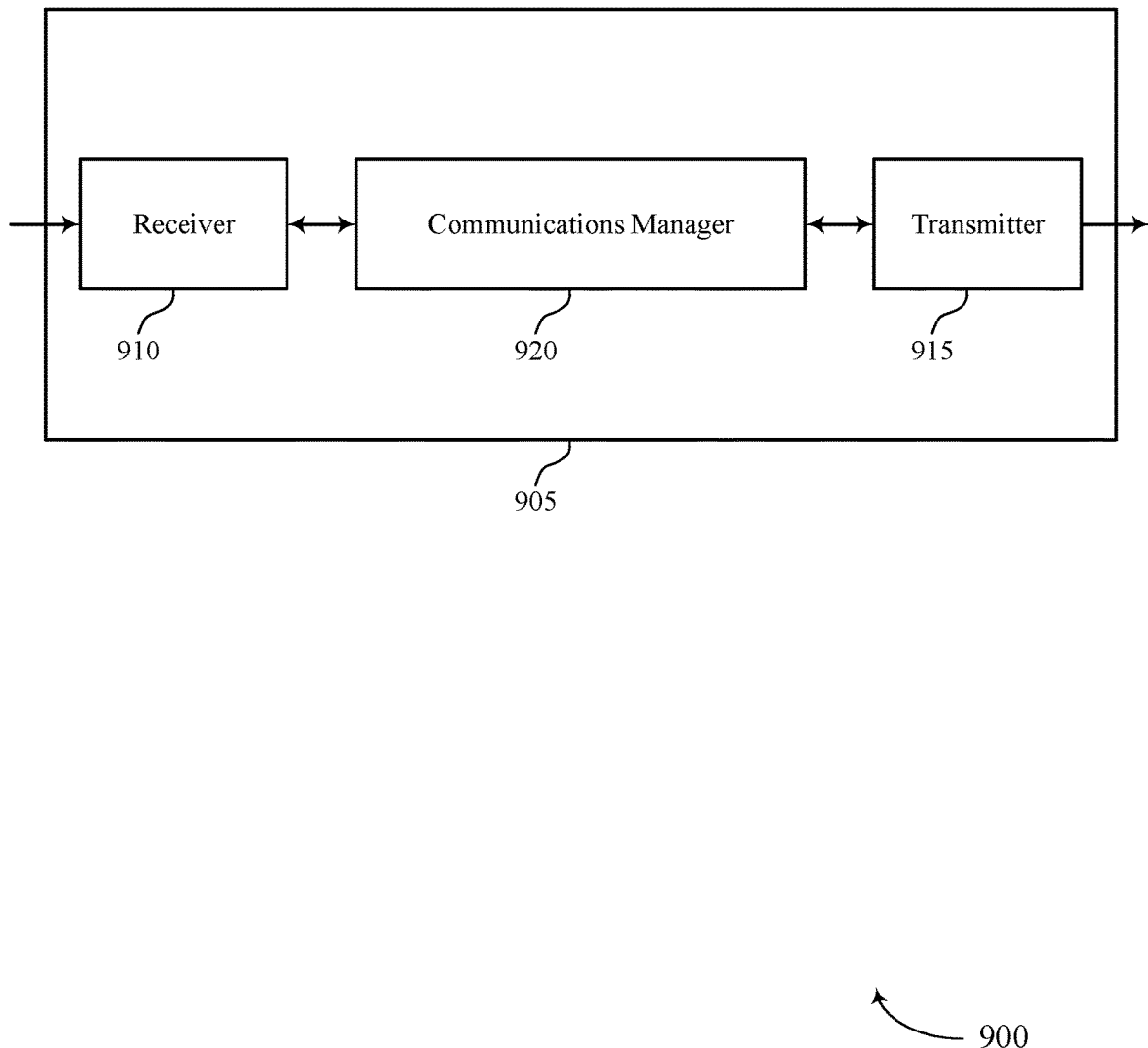
FIGS. 9 and 10 show block diagrams of devices that support methods to transmit feedback in NTNs in accordance with aspects of the present disclosure.

FIG. 9 shows a block diagram 900 of a device 905 that support methods to transmit feedback in NTNs in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to method to transmit feedback in NTNs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to method to transmit feedback in NTNs). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of method to transmit feedback in NTNs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network node in accordance with examples as disclosed herein. For example, the communications manager 920 may be configured as or otherwise support a means for transmitting, to a UE, DCI scheduling a downlink transmission and one or more repetitions of the downlink transmission, the DCI indicating a first uplink resource for a first feedback message indicating whether the UE receives at least one of the downlink transmission and the one or more repetitions. The communications manager 920 may be configured as or otherwise support a means for transmitting the downlink transmission and the one or more repetitions in accordance with the DCI. The communications manager 920 may be configured as or otherwise support a means for receiving a second feedback message on a second uplink resource, the second feedback message including feedback that the UE received the DCI, where the second uplink resource occurs prior to the first uplink resource in a time domain.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for enhanced reliability and reduced latency in communications compared to cases where feedback processes may be disabled. Additionally, the device 905 may apply a configuration for communications with another device with reduced latency, which may improve communications performance and increase spectral efficiency.

Figure 10:
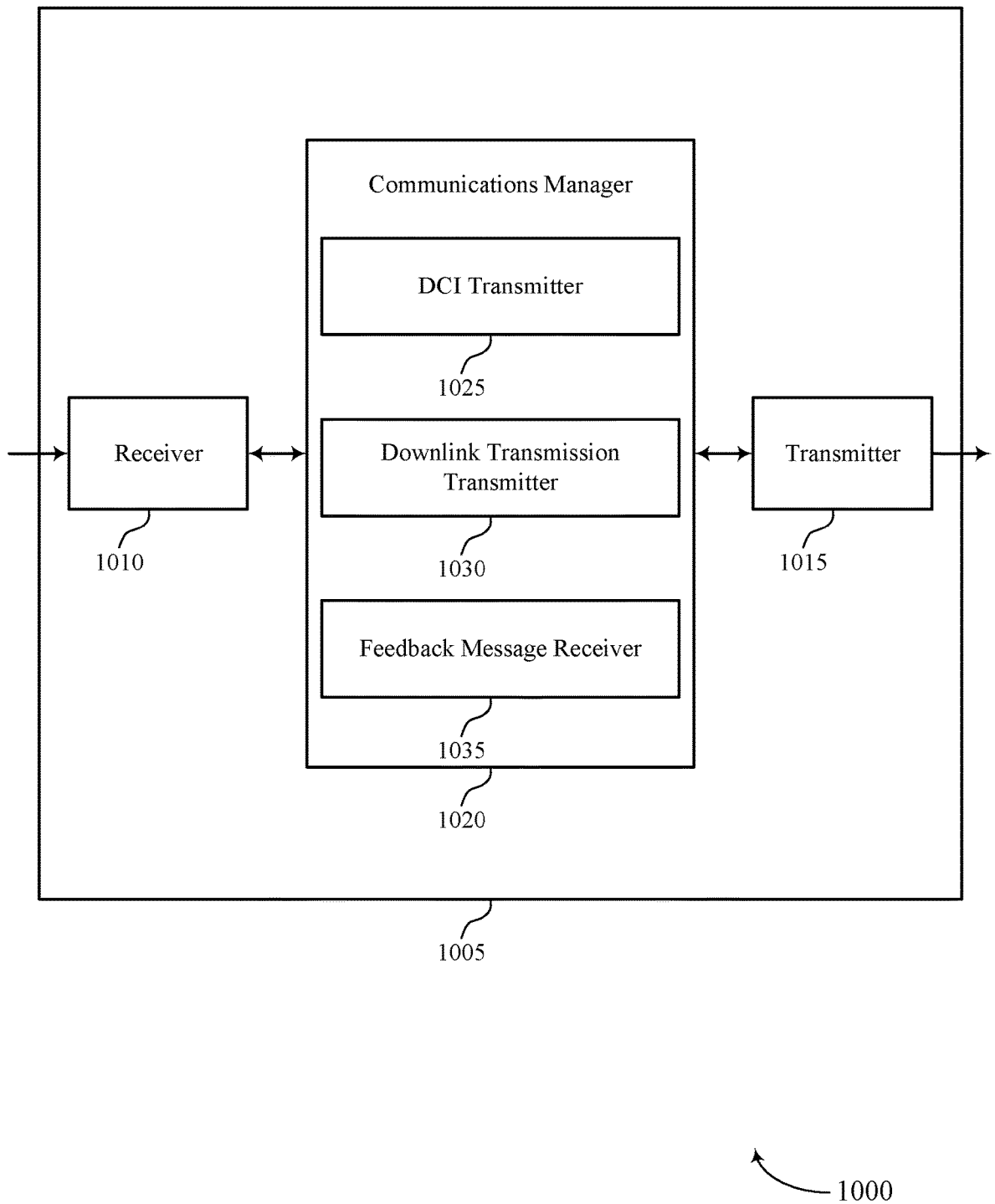

FIG. 10 shows a block diagram 1000 of a device 1005 that supports methods to transmit feedback in NTNs in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to method to transmit feedback in NTNs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to method to transmit feedback in NTNs). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of method to transmit feedback in NTNs as described herein. For example, the communications manager 1020 may include a DCI transmitter 1025, a downlink transmission transmitter 1030, a feedback message receiver 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network node in accordance with examples as disclosed herein. The DCI transmitter 1025 may be configured as or otherwise support a means for transmitting, to a UE, DCI scheduling a downlink transmission and one or more repetitions of the downlink transmission, the DCI indicating a first uplink resource for a first feedback message indicating whether the UE receives at least one of the downlink transmission and the one or more repetitions. The downlink transmission transmitter 1030 may be configured as or otherwise support a means for transmitting the downlink transmission and the one or more repetitions in accordance with the DCI. The feedback message receiver 1035 may be configured as or otherwise support a means for receiving a second feedback message on a second uplink resource, the second feedback message including feedback that the UE received the DCI, where the second uplink resource occurs prior to the first uplink resource in a time domain.

Figure 11:
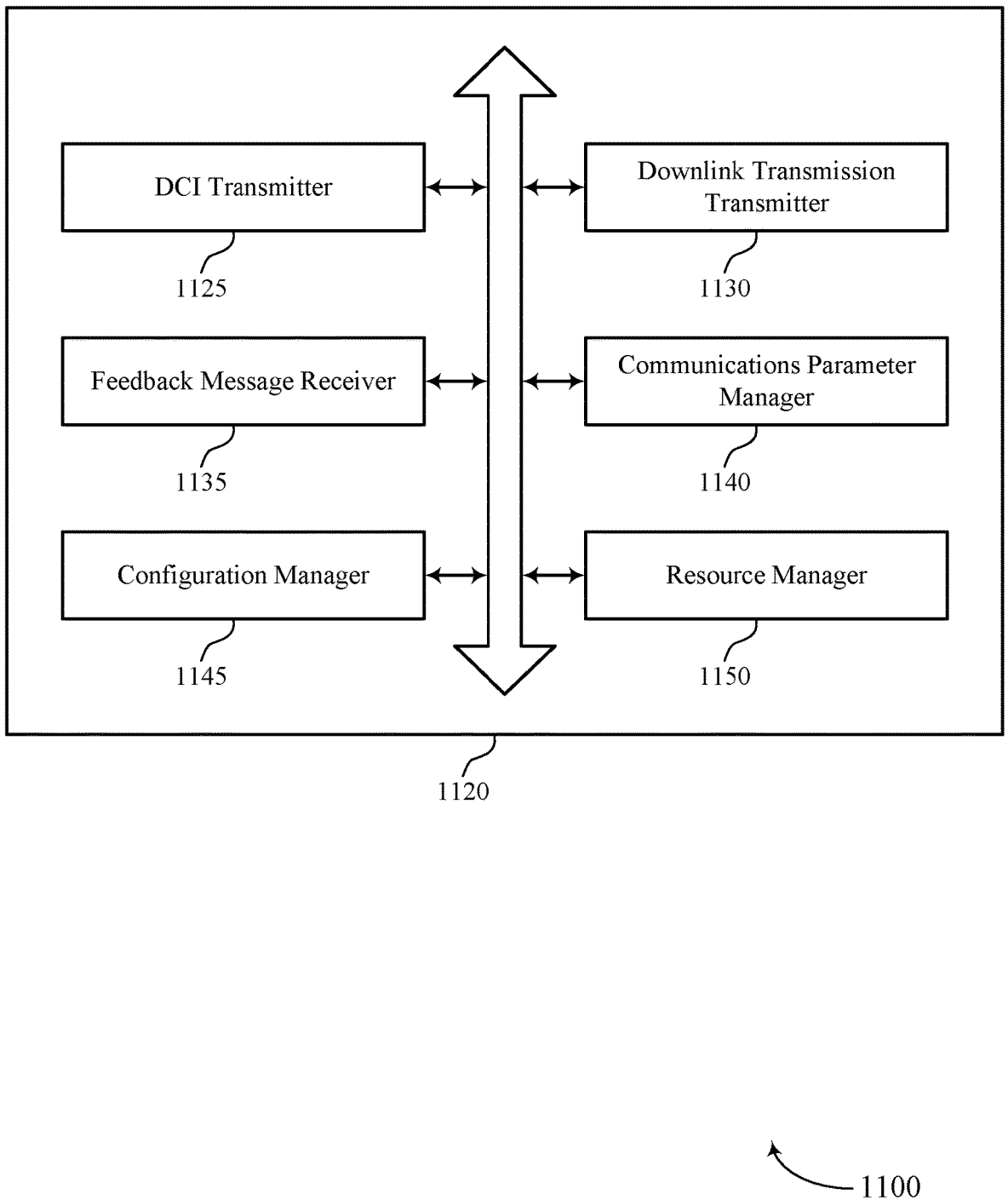
FIG. 11 shows a block diagram of a communications manager that supports methods to transmit feedback in NTNs in accordance with aspects of the present disclosure.

FIG. 11 shows a block diagram 1100 of a communications manager 1120 that supports method to transmit feedback in NTNs in accordance with aspects of the present disclosure. The communications manager 1120 may be an example of aspects of a communications manager 920, a communications manager 1020, or both, as described herein. The communications manager 1120, or various components thereof, may be an example of means for performing various aspects of method to transmit feedback in NTNs as described herein. For example, the communications manager 1120 may include a DCI transmitter 1125, a downlink transmission transmitter 1130, a feedback message receiver 1135, a communications parameter manager 1140, a configuration manager 1145, a resource manager 1150, or any combination thereof. Each of these components may communicate, directly or indirectly, with one another (e.g., via one or more buses).

The communications manager 1120 may support wireless communications at a network node in accordance with examples as disclosed herein. The DCI transmitter 1125 may be configured as or otherwise support a means for transmitting, to a UE, DCI scheduling a downlink transmission and one or more repetitions of the downlink transmission, the DCI indicating a first uplink resource for a first feedback message indicating whether the UE receives the downlink transmission and the one or more repetitions. The downlink transmission transmitter 1130 may be configured as or otherwise support a means for transmitting the downlink transmission and the one or more repetitions in accordance with the DCI. The feedback message receiver 1135 may be configured as or otherwise support a means for receiving a second feedback message on a second uplink resource, the second feedback message including feedback that the UE received the DCI, where the second uplink resource occurs prior to the first uplink resource in a time domain.

In some examples, the communications parameter manager 1140 may be configured as or otherwise support a means for modifying one or more communications parameters for communications with the UE based on receiving the second feedback message. In some examples, the one or more communications parameters correspond to a configuration indicated in the DCI. In some examples, the one or more communications parameters include a quantity of repetitions for a subsequent downlink transmission.

In some examples, the DCI indicates configuration information for communications with the UE, and the configuration manager 1145 may be configured as or otherwise support a means for applying a configuration associated with the configuration information based on receiving the second feedback message on the second uplink resource.

In some examples, the feedback message receiver 1135 may be configured as or otherwise support a means for receiving the second feedback message on the second uplink resource before transmitting one or more of the repetitions, where the second feedback message indicates that the UE received at least one of the downlink transmission and the one or more repetitions. In some examples, the feedback message receiver 1135 may be configured as or otherwise support a means for refraining from transmitting one or more of the repetitions based on receiving the second feedback message.

In some examples, the feedback message receiver 1135 may be configured as or otherwise support a means for receiving the first feedback message on the first uplink resource after receiving the second feedback message on the second uplink resource, where the first feedback message indicates whether the UE received at least one of the downlink transmission and the one or more repetitions.

In some examples, the second feedback message is received after transmitting the downlink transmission and the one or more repetitions, the second feedback message indicating that the UE received at least one of the downlink transmission and the one or more of the repetitions.

In some examples, the resource manager 1150 may be configured as or otherwise support a means for transmitting an indication of a set of candidate uplink resources including the second uplink resource for the second feedback message, where receiving the second feedback message is based on the indication. In some examples, the DCI indicates the set of candidate uplink resources. In some examples, each candidate uplink resource of the set of candidate uplink resources corresponds to a subset of the downlink transmission and the one or more repetitions.

In some examples, the DCI indicates the second uplink resource.

In some examples, the second feedback message includes a negative acknowledgement indicating that the UE received the DCI and failed to receive the downlink transmission or a repetition of the one or more repetitions. In some examples, the second feedback message, the first feedback message, or both, include a HARQ feedback message indicating an ACK or a NACK. In some examples, the network node includes a node in an NTN.

Figure 12:
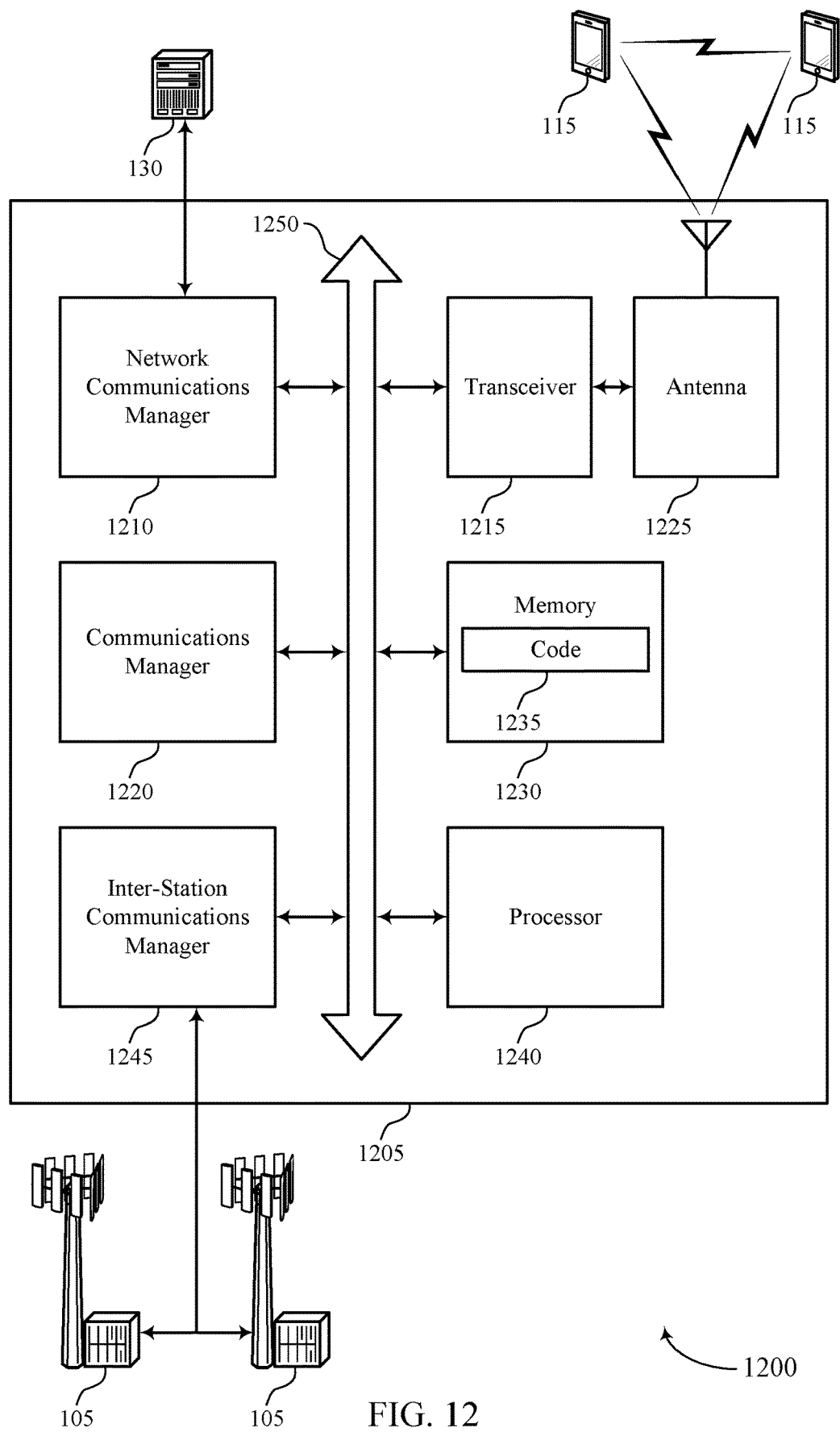
FIG. 12 shows a diagram of a system including a device that supports methods to transmit feedback in NTNs in accordance with aspects of the present disclosure.

FIG. 12 shows a diagram of a system 1200 including a device 1205 that supports methods to transmit feedback in NTNs in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting method to transmit feedback in NTNs). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a network node in accordance with examples as disclosed herein. For example, the communications manager 1220 may be configured as or otherwise support a means for transmitting, to a UE, DCI scheduling a downlink transmission and one or more repetitions of the downlink transmission, the DCI indicating a first uplink resource for a first feedback message indicating whether the UE receives at least one of the downlink transmission and the one or more repetitions. The communications manager 1220 may be configured as or otherwise support a means for transmitting the downlink transmission and the one or more repetitions in accordance with the DCI. The communications manager 1220 may be configured as or otherwise support a means for receiving a second feedback message on a second uplink resource, the second feedback message including feedback that the UE received the DCI, where the second uplink resource occurs prior to the first uplink resource in a time domain.

By including or configuring the communications manager 1220 in accordance with examples as described herein, the device 1205 may support techniques for avoiding stalling in feedback processes due to large propagation delays and RTTs between the device 1205 and a receiving device. The techniques described herein may allow for enhanced reliability and reduced latency, as the device 1205 may adapt communications with the receiving device based on receiving feedback messages more quickly. Additionally, reducing a quantity of repetitions may improve efficiency in resource utilization and improve throughput.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of method to transmit feedback in NTNs as described herein, or the processor 1240 and the memory 1230 may be otherwise configured to perform or support such operations.

Figure 13:
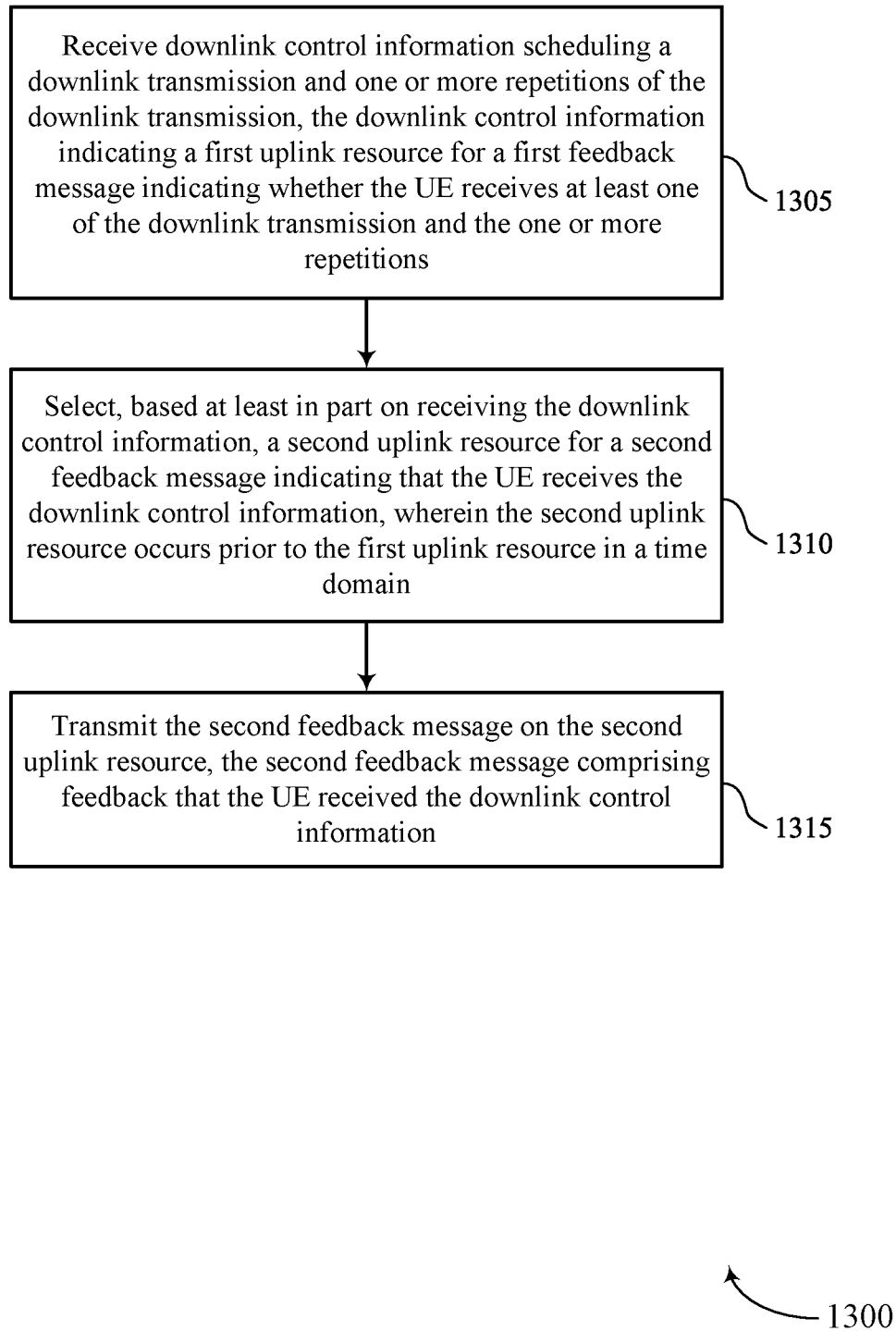
FIGS. 13 through 16 show flowcharts illustrating methods that support methods to transmit feedback in NTNs in accordance with aspects of the present disclosure.

FIG. 13 shows a flowchart illustrating a method 1300 that supports methods to transmit feedback in NTNs in accordance with aspects of the present disclosure. The operations of the method 00 may be implemented by a UE or its components as described herein. For example, the operations of the method 00 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving DCI scheduling a downlink transmission and one or more repetitions of the downlink transmission, the DCI indicating a first uplink resource for a first feedback message indicating whether the UE receives at least one of the downlink transmission and the one or more repetitions. The operations of 1305 may be performed in accordance with examples as disclosed herein. In some examples, aspects of the operations of 1305 may be performed by a DCI receiver 725 as described with reference to FIG. 7.

At 1310, the method may include selecting, based on receiving the DCI, a second uplink resource for a second feedback message indicating that the UE receives the DCI, where the second uplink resource occurs prior to the first uplink resource in a time domain. The operations of 1310 may be performed in accordance with examples as disclosed herein. In some examples, aspects of the operations of 1310 may be performed by a resource selection component 730 as described with reference to FIG. 7.

At 1315, the method may include transmitting the second feedback message on the second uplink resource, the second feedback message including feedback that the UE received the DCI. The operations of 1315 may be performed in accordance with examples as disclosed herein. In some examples, aspects of the operations of 1315 may be performed by a feedback message transmitter 735 as described with reference to FIG. 7.

Figure 14:
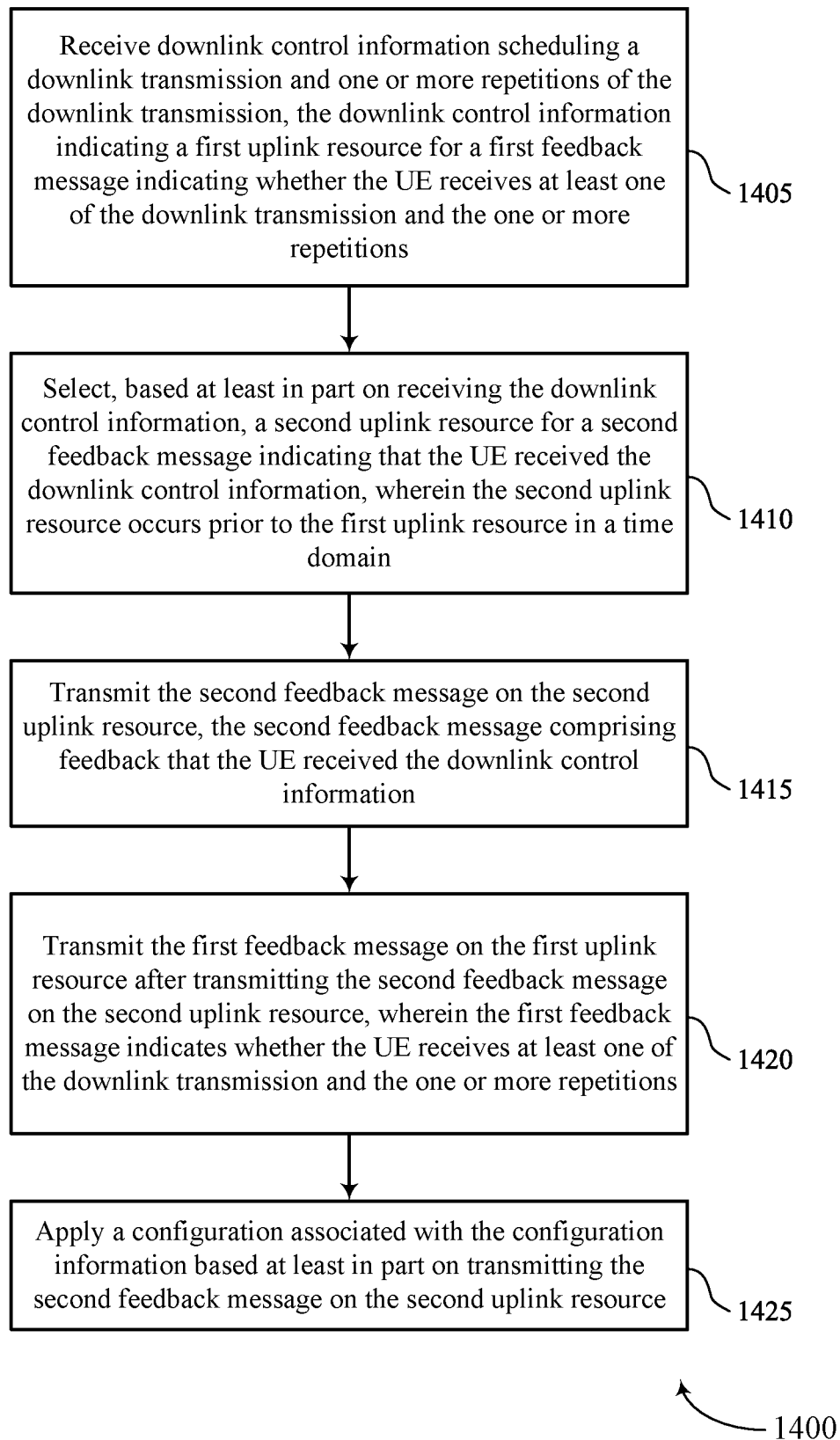

FIG. 14 shows a flowchart illustrating a method 1400 that supports methods to transmit feedback in NTNs in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving DCI scheduling a downlink transmission and one or more repetitions of the downlink transmission, the DCI indicating a first uplink resource for a first feedback message indicating whether the UE receives at least one of the downlink transmission and the one or more repetitions. The operations of 1405 may be performed in accordance with examples as disclosed herein. In some examples, aspects of the operations of 1405 may be performed by a DCI receiver 725 as described with reference to FIG. 7.

At 1410, the method may include selecting, based on receiving the DCI, a second uplink resource for a second feedback message indicating that the UE receives the DCI, where the second uplink resource occurs prior to the first uplink resource in a time domain. The operations of 1410 may be performed in accordance with examples as disclosed herein. In some examples, aspects of the operations of 1410 may be performed by a resource selection component 730 as described with reference to FIG. 7.

At 1415, the method may include transmitting the second feedback message on the second uplink resource, the second feedback message including feedback that the UE received the DCI. The operations of 1415 may be performed in accordance with examples as disclosed herein. In some examples, aspects of the operations of 1415 may be performed by a feedback message transmitter 735 as described with reference to FIG. 7.

At 1420, the method may include transmitting the first feedback message on the first uplink resource after transmitting the second feedback message on the second uplink resource, where the first feedback message indicates whether the UE receives at least one of the downlink transmission and the one or more repetitions. The operations of 1420 may be performed in accordance with examples as disclosed herein. In some examples, aspects of the operations of 1420 may be performed by a feedback message transmitter 735 as described with reference to FIG. 7.

At 1425, the method may include applying a configuration associated with the configuration information based on transmitting the second feedback message on the second uplink resource. The operations of 1425 may be performed in accordance with examples as disclosed herein. In some examples, aspects of the operations of 1425 may be performed by a configuration component 740 as described with reference to FIG. 7.

Figure 15:
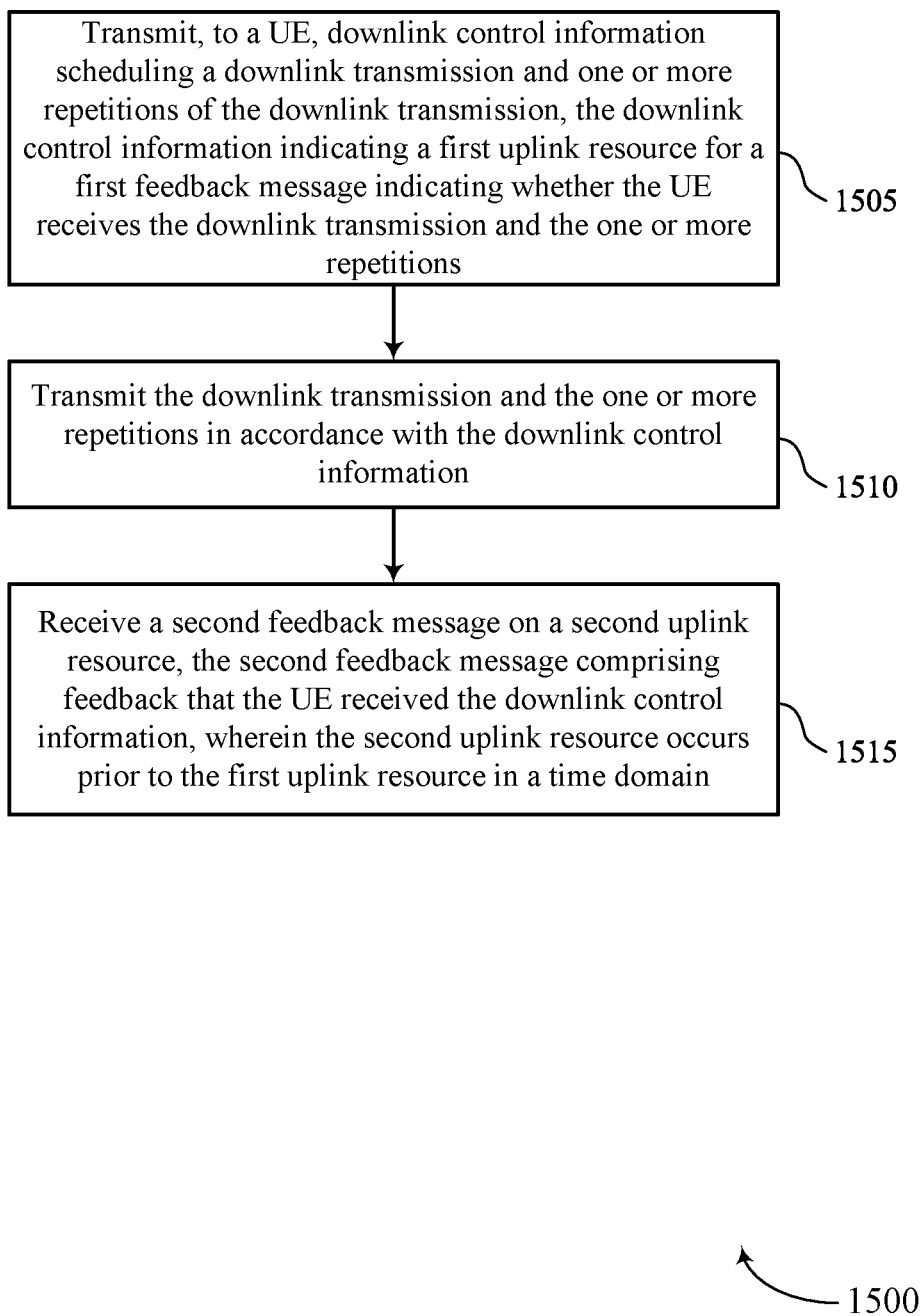

FIG. 15 shows a flowchart illustrating a method 1500 that supports methods to transmit feedback in NTNs in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, DCI scheduling a downlink transmission and one or more repetitions of the downlink transmission, the DCI indicating a first uplink resource for a first feedback message indicating whether the UE receives the downlink transmission and the one or more repetitions. The operations of 1505 may be performed in accordance with examples as disclosed herein. In some examples, aspects of the operations of 1505 may be performed by a DCI transmitter 1025 as described with reference to FIG. 10.

At 1510, the method may include transmitting the downlink transmission and the one or more repetitions in accordance with the DCI. The operations of 1510 may be performed in accordance with examples as disclosed herein. In some examples, aspects of the operations of 1510 may be performed by a downlink transmission transmitter 1030 as described with reference to FIG. 10.

At 1515, the method may include receiving a second feedback message on a second uplink resource, the second feedback message including feedback that the UE received the DCI, where the second uplink resource occurs prior to the first uplink resource in a time domain. The operations of 1515 may be performed in accordance with examples as disclosed herein. In some examples, aspects of the operations of 1515 may be performed by a feedback message receiver 1035 as described with reference to FIG. 10.

Figure 16:
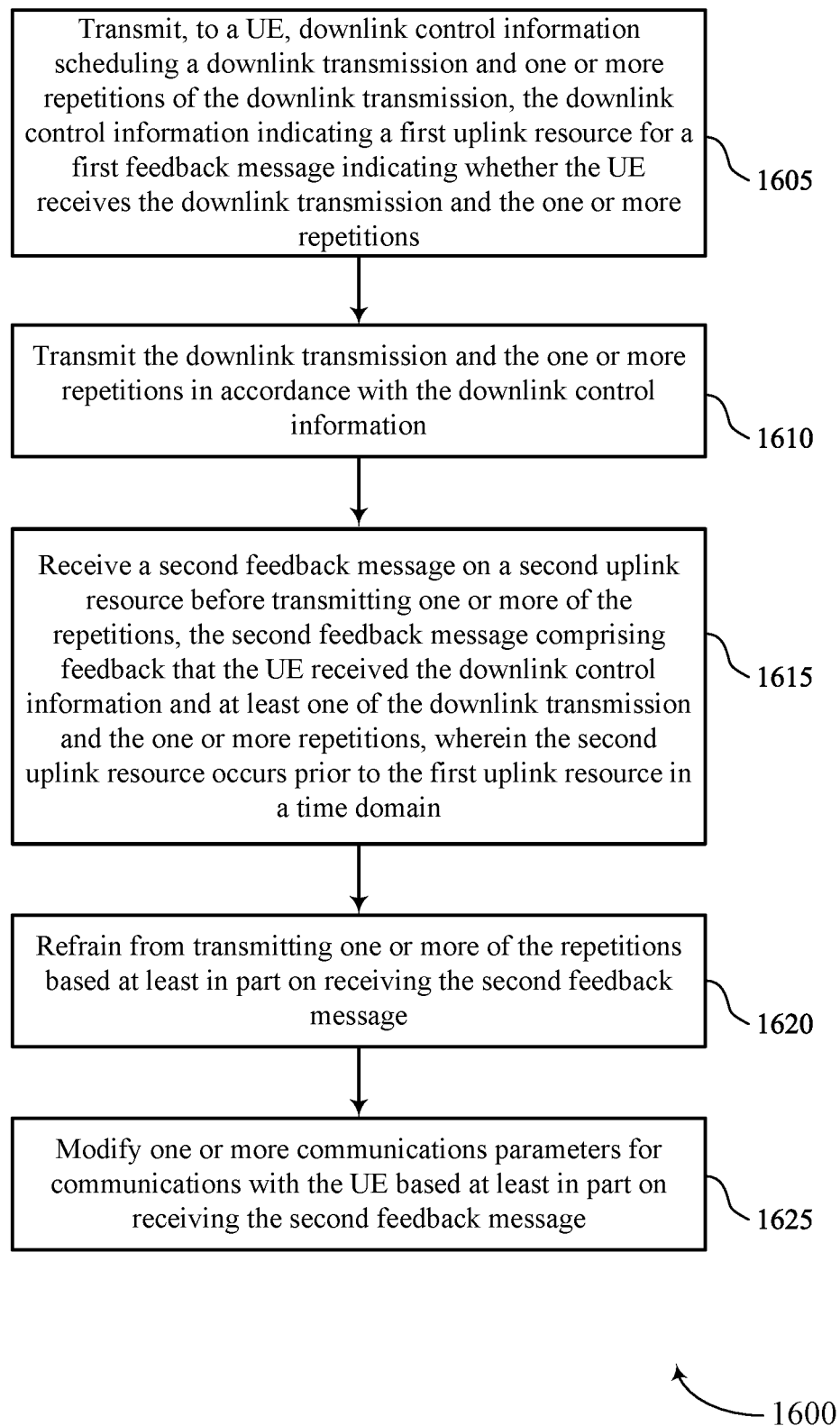

FIG. 16 shows a flowchart illustrating a method 1600 that supports methods to transmit feedback in NTNs in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, DCI scheduling a downlink transmission and one or more repetitions of the downlink transmission, the DCI indicating a first uplink resource for a first feedback message indicating whether the UE receives the downlink transmission and the one or more repetitions. The operations of 1605 may be performed in accordance with examples as disclosed herein. In some examples, aspects of the operations of 1605 may be performed by a DCI transmitter 1125 as described with reference to FIG. 11.

At 1610, the method may include transmitting the downlink transmission and the one or more repetitions in accordance with the DCI. The operations of 1610 may be performed in accordance with examples as disclosed herein. In some examples, aspects of the operations of 1610 may be performed by a downlink transmission transmitter 1130 as described with reference to FIG. 11.

At 1615, the method may include receiving a second feedback message on a second uplink resource before transmitting one or more of the repetitions, the second feedback message including feedback that the UE received the DCI and at least one of the downlink transmission and the one or more repetitions, where the second uplink resource occurs prior to the first uplink resource in a time domain. The operations of 1615 may be performed in accordance with examples as disclosed herein. In some examples, aspects of the operations of 1615 may be performed by a feedback message receiver 1135 as described with reference to FIG. 11.

At 1620, the method may include refraining from transmitting one or more of the repetitions based on receiving the second feedback message. The operations of 1620 may be performed in accordance with examples as disclosed herein. In some examples, aspects of the operations of 1620 may be performed by a feedback message receiver 1135 as described with reference to FIG. 11.

At 1625, the method may include modifying one or more communications parameters for communications with the UE based on receiving the second feedback message. The operations of 1625 may be performed in accordance with examples as disclosed herein. In some examples, aspects of the operations of 1625 may be performed by a communications parameter manager 1140 as described with reference to FIG. 11.

The following provides an overview of aspects of the present disclosure:

Aspect 1: A method for wireless communications at a UE, comprising: receiving DCI scheduling a downlink transmission and one or more repetitions of the downlink transmission, the DCI indicating a first uplink resource for a first feedback message indicating whether the UE receives at least one of the downlink transmission and the one or more repetitions; selecting, based at least in part on receiving the DCI, a second uplink resource for a second feedback message indicating that the UE receives the DCI, wherein the second uplink resource occurs prior to the first uplink resource in a time domain; and transmitting the second feedback message on the second uplink resource, the second feedback message comprising feedback that the UE received the DCI.

Aspect 2: The method of aspect 1, further comprising: transmitting the first feedback message on the first uplink resource after transmitting the second feedback message on the second uplink resource, wherein the first feedback message indicates whether the UE receives at least one of the downlink transmission and the one or more repetitions.

Aspect 3: The method of aspect 2, further comprising: monitoring a downlink channel for the downlink transmission and the one or more repetitions based at least in part on receiving the DCI, wherein transmitting the first feedback message is based at least in part on monitoring the downlink channel.

Aspect 4: The method of aspect 3, wherein the second feedback message is transmitted prior to monitoring the downlink channel for the downlink transmission and the one or more repetitions.

Aspect 5: The method of any of aspects 3 through 4, wherein the second uplink resource occurs after the UE monitors for a subset of the downlink transmission and the one or more repetitions.

Aspect 6: The method of aspect 5, further comprising: transmitting, as part of the second feedback message, feedback for the subset of the downlink transmission and the one or more repetitions.

Aspect 7: The method of any of aspects 1 through 6, wherein the DCI indicates configuration information for communications with a network node, the method further comprising: applying a configuration associated with the configuration information based at least in part on transmitting the second feedback message on the second uplink resource.

Aspect 8: The method of any of aspects 1 through 7, further comprising: receiving at least one of the downlink transmission and the one or more repetitions prior to transmitting the second feedback message, wherein the second feedback message indicates that the UE receives at least one of the downlink transmission and the one or more repetitions.

Aspect 9: The method of aspect 8, further comprising: refraining from transmitting the first feedback message on the first uplink message based at least in part on receiving at least one of the downlink transmission and the one or more repetitions prior to transmitting the second feedback message and transmitting the second feedback message that indicates that the UE receives at least one of the downlink transmission and the one or more repetitions.

Aspect 10: The method of any of aspects 1 through 9, wherein selecting the second uplink resource further comprises: selecting the second uplink resource based at least in part on a mapping between the second uplink resource and a downlink resource over which the DCI is received, a mapping between the second uplink resource and a quantity of the one or more repetitions, or a combination thereof.

Aspect 11: The method of any of aspects 1 through 10, wherein selecting the second uplink resource further comprises: selecting the second uplink resource from a set of candidate uplink resources for the second feedback message based at least in part on successfully receiving a corresponding downlink transmission or a repetition of the one or more repetitions.

Aspect 12: The method of aspect 11, wherein the DCI indicates the set of candidate uplink resources.

Aspect 13: The method of any of aspects 11 through 12, wherein the set of candidate uplink resources is indicated by at least one of the DCI, a downlink resource over which the DCI is received, and a quantity of the downlink transmission and the one or more repetitions.

Aspect 14: The method of any of aspects 1 through 13, wherein the second feedback message comprises a negative acknowledgement indicating that the UE received the DCI and failed to receive the downlink transmission or a repetition of the one or more repetitions.

Aspect 15: The method of any of aspects 1 through 14, wherein the DCI indicates the second uplink resource.

Aspect 16: The method of any of aspects 1 through 15, wherein the second feedback message, the first feedback message, or both, comprise a HARQ feedback message indicating an acknowledgement or a negative acknowledgement.

Aspect 17: The method of any of aspects 1 through 16, wherein the UE comprises a node in an NTN.

Aspect 18: A method for wireless communications at a network node, comprising: transmitting, to a UE, DCI scheduling a downlink transmission and one or more repetitions of the downlink transmission, the DCI indicating a first uplink resource for a first feedback message indicating whether the UE receives the downlink transmission and the one or more repetitions; transmitting the downlink transmission and the one or more repetitions in accordance with the DCI; and receiving a second feedback message on a second uplink resource, the second feedback message comprising feedback that the UE received the DCI, wherein the second uplink resource occurs prior to the first uplink resource in a time domain.

Aspect 19: The method of aspect 18, further comprising: modifying one or more communications parameters for communications with the UE based at least in part on receiving the second feedback message.

Aspect 20: The method of aspect 19, wherein the one or more communications parameters correspond to a configuration indicated in the DCI.

Aspect 21: The method of any of aspects 19 through 20, wherein the one or more communications parameters comprise a quantity of repetitions for a subsequent downlink transmission.

Aspect 22: The method of any of aspects 18 through 21, wherein the DCI indicates configuration information for communications with the UE, the method further comprising: applying a configuration associated with the configuration information based at least in part on receiving the second feedback message on the second uplink resource.

Aspect 23: The method of any of aspects 18 through 22, further comprising: receiving the second feedback message on the second uplink resource before transmitting one or more of the repetitions, wherein the second feedback message indicates that the UE received at least one of the downlink transmission and the one or more repetitions; and refraining from transmitting one or more of the repetitions based at least in part on receiving the second feedback message.

Aspect 24: The method of any of aspects 18 through 23, further comprising: receiving the first feedback message on the first uplink resource after receiving the second feedback message on the second uplink resource, wherein the first feedback message indicates whether the UE received at least one of the downlink transmission and the one or more repetitions.

Aspect 25: The method of any of aspects 18 through 24, wherein the second feedback message is received after transmitting the downlink transmission and the one or more repetitions, the second feedback message indicating that the UE received at least one of the downlink transmission and the one or more of the repetitions.

Aspect 26: The method of any of aspects 18 through 25, further comprising: transmitting an indication of a set of candidate uplink resources including the second uplink resource for the second feedback message, wherein receiving the second feedback message is based at least in part on the indication.

Aspect 27: The method of aspect 26, wherein the DCI indicates the set of candidate uplink resources.

Aspect 28: The method of any of aspects 26 through 27, wherein each candidate uplink resource of the set of candidate uplink resources corresponds to a subset of the downlink transmission and the one or more repetitions.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a network node, comprising a processor; memory coupled with the processor; and instructions stored in the memory and executable by the processor to cause the apparatus to perform a method of any of aspects 18 through 28.

Aspect 33: An apparatus for wireless communications at a network node, comprising at least one means for performing a method of any of aspects 18 through 28.

Aspect 34: A non-transitory computer-readable medium storing code for wireless communications at a network node, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving downlink control information scheduling a downlink transmission and one or more repetitions of the downlink transmission, the downlink control information indicating a first uplink resource for a first feedback message indicating whether the UE receives at least one of the downlink transmission and the one or more repetitions and the downlink control information indicating a set of candidate second uplink resources for a second feedback message that indicates whether the UE receives the downlink control information;
    monitoring a downlink channel for a subset of the downlink transmission and the one or more repetitions based at least in part on receiving the downlink control information;
    selecting, based at least in part on receiving the downlink control information, a second uplink resource for the second feedback message indicating that the UE receives the downlink control information, wherein the second uplink resource is selected from the set of candidate second uplink resources based at least in part on successfully receiving the downlink transmission or the one or more repetitions, wherein the second uplink resource occurs prior to the first uplink resource in a time domain, wherein the second uplink resource occurs after the UE monitors for the subset of the downlink transmission and the one or more repetitions; and
    transmitting the second feedback message on the second uplink resource, the second feedback message comprising feedback that the UE received the downlink control information.

2. The method of claim 1, further comprising:
    transmitting the first feedback message on the first uplink resource after transmitting the second feedback message on the second uplink resource, wherein the first feedback message indicates whether the UE receives at least one of the downlink transmission and the one or more repetitions, or a combination thereof.

3. The method of claim 2, wherein transmitting the first feedback message is based at least in part on monitoring the downlink channel.

4. The method of claim 1, further comprising:
transmitting, as part of the second feedback message, feedback for at least one of the subset of the downlink transmission and the one or more repetitions.

5. The method of claim 1, wherein the downlink control information indicates configuration information for communications with a network node, the method further comprising:
applying a configuration associated with the configuration information based at least in part on transmitting the second feedback message on the second uplink resource.

6. The method of claim 1, further comprising:
receiving at least one of the downlink transmission and the one or more repetitions prior to transmitting the second feedback message, wherein the second feedback message indicates that the UE receives at least one of the subset of the downlink transmission and the one or more repetitions.

7. The method of claim 6, further comprising:
refraining from transmitting the first feedback message on the first uplink resource based at least in part on receiving at least one of the downlink transmission and the one or more repetitions prior to transmitting the second feedback message and transmitting the second feedback message that indicates that the UE receives at least one of the subset of the downlink transmission and the one or more repetitions.

8. The method of claim 1, wherein the downlink control information indicates the set of candidate second uplink resources.

9. The method of claim 1, wherein the set of candidate second uplink resources is indicated by at least one of the downlink control information, a downlink resource over which the downlink control information is received, and a quantity of the downlink transmission and the one or more repetitions.

10. The method of claim 1, wherein the second feedback message comprises a negative acknowledgement indicating that the UE received the downlink control information and failed to receive the downlink transmission or a repetition of the one or more repetitions.

11. The method of claim 1, wherein the second feedback message, the first feedback message, or both, comprise a hybrid automatic repeat request feedback message indicating an acknowledgement or a negative acknowledgement.

12. The method of claim 1, wherein the UE comprises a node in a non-terrestrial network.

13. A method for wireless communications at a network node, comprising:
transmitting, to a user equipment (UE), downlink control information scheduling a downlink transmission and one or more repetitions of the downlink transmission, the downlink control information indicating a first uplink resource for a first feedback message indicating whether the UE receives the downlink transmission and the one or more repetitions and the downlink control information indicating a set of candidate uplink resources for a second feedback message indicating whether the UE receives the downlink control information;
transmitting the downlink transmission and the one or more repetitions in accordance with the downlink control information; and
receiving the second feedback message on a second uplink resource from the set of candidate uplink resources, the second feedback message comprising feedback that the UE received the downlink control information, wherein the second uplink resource occurs prior to the first uplink resource in a time domain, wherein the second uplink resource occurs after transmitting a subset of the downlink transmission and the one or more repetitions.

14. The method of claim 13, further comprising:
modifying one or more communications parameters for communications with the UE based at least in part on receiving the second feedback message.

15. The method of claim 14, wherein the one or more communications parameters comprise a quantity of repetitions for a subsequent downlink transmission.

16. The method of claim 13, wherein the downlink control information indicates configuration information for communications with the UE, the method further comprising:
applying a configuration associated with the configuration information based at least in part on receiving the second feedback message on the second uplink resource.

17. The method of claim 13, further comprising:
receiving the second feedback message on the second uplink resource before transmitting the one or more repetitions, wherein the second feedback message indicates that the UE received the downlink transmission; and
refraining from transmitting the one or more repetitions based at least in part on receiving the second feedback message.

18. The method of claim 13, wherein the second feedback message is received after transmitting the downlink transmission and the one or more repetitions, the second feedback message indicating that the UE received at least one of the subset of the downlink transmission and the one or more repetitions.

19. The method of claim 13, wherein each candidate uplink resource of the set of candidate uplink resources corresponds to a subset of the downlink transmission and the one or more repetitions.

20. An apparatus for wireless communications at a user equipment (UE), comprising:
one or more memories storing processor-executable instructions; and
one or more processors coupled with the one or more memories and individually or collectively operable to execute the instructions to cause the apparatus to:
receive downlink control information scheduling a downlink transmission and one or more repetitions of the downlink transmission, the downlink control information indicating a first uplink resource for a first feedback message indicating whether the UE receives the downlink transmission and the one or more repetitions and the downlink control information indicating a set of candidate second uplink resources for a second feedback message that indicates whether the UE receives the downlink control information;

monitor a downlink channel for a subset of the downlink transmission and the one or more repetitions based at least in part on receiving the downlink control information;

select, based at least in part on receiving the downlink control information, a second uplink resource for the second feedback message indicating that the UE receives the downlink control information, wherein the second uplink resource is selected from the set of candidate second uplink resources based at least in part on successfully receiving the downlink transmission or the one or more repetitions, wherein the second uplink resource occurs after the UE monitors for the subset of the downlink transmission and the one or more repetitions; and transmit the second feedback message on the second uplink resource, the second feedback message comprising feedback that the UE received the downlink control information.

21. An apparatus for wireless communications at a network node of a non-terrestrial network, comprising:

one or more memories storing processor-executable instructions; and one or more processors coupled with the one or more memories and individually or collectively operable to execute the instructions to cause the apparatus to:

transmit, to a user equipment (UE), downlink control information scheduling a downlink transmission and one or more repetitions of the downlink transmission, the downlink control information indicating a first uplink resource for a first feedback message indicating whether the UE receives the downlink transmission and the one or more repetitions and the downlink control information indicating a set of candidate uplink resources for a second feedback message indicating whether the UE receives the downlink control information;

transmit the downlink transmission and the one or more repetitions in accordance with the downlink control information; and receive the second feedback message on a second uplink resource from the set of candidate uplink resources, the second feedback message comprising feedback that the UE received the downlink control information, wherein the second uplink resource occurs prior to the first uplink resource in a time domain, wherein the second uplink resource occurs after transmitting a subset of the downlink transmission and the one or more repetitions.

* * * * *